(12) United States Patent
Takahashi et al.

(10) Patent No.: US 10,312,826 B2
(45) Date of Patent: Jun. 4, 2019

(54) POWER CONVERSION APPARATUS

(71) Applicant: DENSO CORPORATION, Kariya, Aichi-pref. (JP)

(72) Inventors: Masaya Takahashi, Kariya (JP); Nobuhisa Yamaguchi, Kariya (JP); Masaki Kanesaki, Kariya (JP); Shoichi Takemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/135,039

(22) Filed: Sep. 19, 2018

(65) Prior Publication Data

US 2019/0089267 A1   Mar. 21, 2019

(30) Foreign Application Priority Data

Sep. 20, 2017 (JP) .................................. 2017-180234

(51) Int. Cl.
| | |
|---|---|
| *H02M 7/53* | (2006.01) |
| *H02M 7/538* | (2007.01) |
| *H02M 7/5387* | (2007.01) |
| *H02M 7/487* | (2007.01) |
| *H02M 7/483* | (2007.01) |
| *H02M 7/48* | (2007.01) |

(52) U.S. Cl.
CPC ............ *H02M 7/538* (2013.01); *H02M 7/487* (2013.01); *H02M 7/53875* (2013.01); *H02M 2007/4811* (2013.01); *H02M 2007/4835* (2013.01)

(58) Field of Classification Search
None
See application file for complete search history.

(56) References Cited

U.S. PATENT DOCUMENTS

| | | | | | |
|---|---|---|---|---|---|
| 5,991,172 | A | * | 11/1999 | Jovanovic | ........... H02M 1/4258 363/132 |
| 6,169,668 | B1 | * | 1/2001 | Clayton | .............. H02M 3/3378 363/133 |
| 7,573,731 | B2 | * | 8/2009 | Kwon | ................. H02M 3/3372 363/25 |
| 9,774,263 | B1 | * | 9/2017 | Chen | ................. H02M 3/33507 |
| 2014/0009981 | A1 | * | 1/2014 | Charles Knill | ......... H02M 7/48 363/37 |

FOREIGN PATENT DOCUMENTS

JP   H05-068381   3/1993

* cited by examiner

*Primary Examiner* — Jeffrey A Gblende
(74) *Attorney, Agent, or Firm* — Nixon & Vanderhye PC

(57) ABSTRACT

In a power conversion apparatus, a controller calculates a duty ratio being a ratio of an on-duration of each of bridge-circuit switches configured by first to fourth switches to a switching period, and outputs a gate signal to each of the bridge-circuit switches. The controller adjusts the duty ratio of each of the bridge-circuit switches such that a switch-current difference becomes closer to a value obtained by multiplying an input-current difference by the predetermined target ratio that is a value greater than 0 and less than 1. The switch-current difference is a difference between a first switch current and a second switch current or a difference between a third switch current and a fourth switch current detected by a switch-current sensor at predetermined timings in the switching period. The input-current difference is a difference between input currents detected by an input-current sensor simultaneously with detection timings of switch currents.

16 Claims, 19 Drawing Sheets

POWER CONVERSION APPARATUS

CROSS-REFERENCE TO RELATED APPLICATION

This application is based on and claims the benefit of priority from Japanese Patent Application No. 2017-180234, filed Sep. 20, 2017. The entire disclosure of the above application is incorporated herein by reference.

BACKGROUND

Technical Field

The present disclosure relates to a power conversion apparatus.

Related Art

Conventionally, a power conversion apparatus that alternately energizes two primary coils on a primary side of a transformer using a push-pull circuit is known.

For example, in a power supply apparatus for a push-pull switching regulator disclosed in JP-A-H05-68381, a microcomputer controls a conduction duration of a power element when a flow of overcurrent to the power element is detected. Specifically, the microcomputer performs a process to output a signal in which the conduction duration of a power element in which the current is generated is shortened by a prescribed value and the conduction duration of another power element is lengthened by a prescribed value. As a result, the flow of overcurrent caused by a biased magnetization phenomenon in transformer can be prevented.

In the conventional technology in JP-A-H05-68381, the biased magnetization phenomenon that occurs as a result of on-duration errors in switches, i.e., field effect transistors (FETs), and internal-resistance variations in current paths can be suppressed. However, because control is performed through use of only a peak value of a switch current, the biased magnetization phenomenon that occurs as a result of variations in leakage inductance in the primary coils cannot be suppressed.

Here, a typical, conventional push-pull circuit includes a smoothing capacitor and two switches. A transformer primary-side current that flows through two primary coils that are connected to a common center tap is controlled by the two switches being alternately operated. For example, a capacitive load is connected to a secondary coil of the transformer. An output current flowing to the load resonates with LC (inductance/capacitance) components in a secondary circuit, thereby configuring a resonant inverter.

In addition, to reduce load placed on the smoothing capacitor and reduce ripple currents in the typical, conventional push-pull circuit, use of an active-clamp push-pull circuit can be considered. The active-clamp push-pull circuit includes two lower-arm switches, two upper-arm switches, and a clamp capacitor. Source terminals of the upper-arm switches and drain terminals of the lower-arm switches are respectively connected to switch-side end portions of a first primary coil and a second primary coil. The clamp capacitor is connected between a low-potential side input terminal and drain terminals of the upper-arm switches.

The biased magnetization phenomenon occurs not only in the typical, conventional push-pull circuit, but also in the active-clamp push-pull circuit. In addition, the issue in which the biased magnetization phenomenon that occurs as a result of variations in the leakage inductance in the primary coils cannot be suppressed in the conventional technology in JP-A-H05-68381 also similarly applies to the active-clamp push-pull circuit.

SUMMARY

It is thus desired to provide a power conversion apparatus that uses an active-clamp push-pull circuit and is capable of suppressing biased magnetization currents.

An exemplary embodiment of the present disclosure provides a power conversion apparatus that includes a smoothing capacitor, a first primary coil, a second primary coil, a secondary coil, first to fourth switches, a clamp capacitor, a controller, a switch-current sensor, and an input-current sensor.

The smoothing capacitor is connected between a high-potential side input terminal and a low-potential side input terminal to which an input voltage of a direct-current power supply is applied.

The first primary coil and the second primary coil configure a primary side of a transformer. One end portion of the first primary coil and one end portion of the second primary coil are connected to a center tap that is common to the first primary coil and the second primary coil. The center tap is connected to the high-potential side input terminal.

The secondary coil configures a secondary side of the transformer. A load is connected to the secondary coil.

The first switch and the second switch configure a lower arm of a bridge circuit. A high-potential-side terminal of the first switch is connected to a switch-side end portion of the first primary coil that is the other end portion of the first primary coil on a side opposite the center tap. A low-potential-side terminal of the first switch is connected to the low-potential side input terminal. A high-potential-side terminal of the second switch is connected to a switch-side end portion of the second primary coil that is the other end portion of the second primary coil on a side opposite the center tap. A low-potential-side terminal of the second switch is connected to the low-potential side input terminal. The first switch and the second switch alternately operate at a predetermined switching period.

The third switch and the fourth switch configure an upper arm of the bridge circuit. One terminal of the third switch is connected to the switch-side end portion of the first primary coil. One terminal of the fourth switch is connected to the switch-side end portion of the second primary coil. The third switch and the fourth switch alternately operate at the same switching period as the first switch and the second switch.

The clamp capacitor is connected between the other terminal of the third switch and the low-potential side input terminal and between the other terminal of the fourth switch and the low-potential side input terminal.

The controller calculates a duty ratio that is a ratio of an on-duration of each of bridge-circuit switches to the switching period. The bridge-circuit switches are configured by the first to fourth switches. The controller outputs a gate signal to each of the bridge-circuit switches.

Regarding switch currents that flow through the bridge-current switches, the switch-current sensor detects a first switch current that flows through the first switch and a second switch current that flows through the second switch, or a third switch current that flows through the third switch and a fourth switch current that flows through the fourth switch.

The input-current sensor detects an input current that flows from the high-potential side input terminal to the center tap via a high-potential side line.

A switch-current difference is a difference between the first switch current and the second switch current or a difference between the third switch current and the fourth switch current detected by the switch-current sensor at predetermined timings in the switching period. An input-current difference is a difference between input currents detected by the input-current sensor simultaneously with detection timings of the switch currents.

The controller adjusts the duty ratio of each of the bridge-circuit switches such that the switch-current difference becomes closer to a value obtained by multiplying the input-current difference by a predetermined target ratio that is a value greater than 0 and less than 1.

In the exemplary embodiment, the target ratio is preferably 0.5. A value within a range that is recognized as being essentially equal to 0.5 based on common general technical knowledge in the applicable technical field is interpreted as being 0.5.

The present disclosure focuses on a difference in current amplitude caused by variations in leakage inductance in the first primary coil and the second primary coil appearing in the difference between input currents. In addition, the present disclosure is capable of suppressing a biased magnetization current, that is, an imbalance in average currents of the primary coils by adjusting the duty ratio of each of the bridge-circuit switches such that the switch-current difference becomes closer to a value obtained by the input-current difference being multiplied by the target ratio.

DESCRIPTION OF THE EMBODIMENTS

A power conversion apparatus according to a plurality of embodiments will hereinafter be described with reference to the drawings. First to seventh embodiments are collectively referred to as a "present embodiment".

A power conversion apparatus according to the present embodiment is an inverter that converts direct-current power inputted to a primary side of a transformer by performing a switching operation of a push-pull circuit, and outputs alternating-current power to a secondary side of the transformer. For example, when a capacitive load is connected to the secondary side, an output current that flows to the load resonates with LC components in a secondary circuit, thereby configuring a resonant inverter.

[Configuration and Operations of the Inverter]

Figure 1:
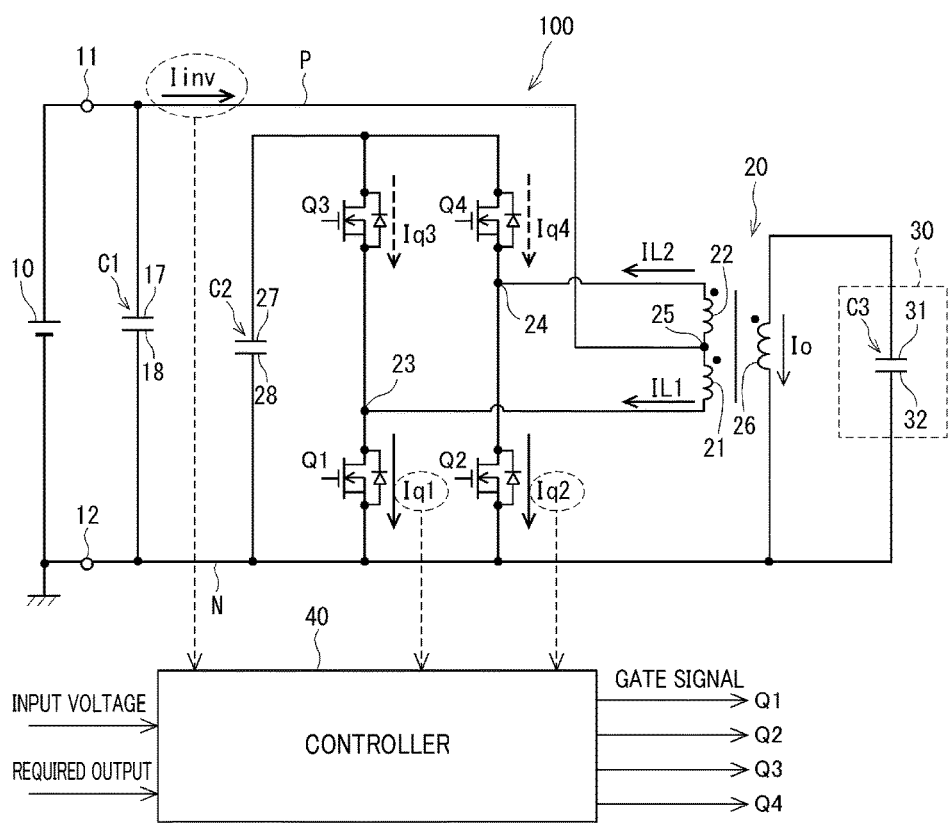
FIG. 1 is a configuration diagram of a power conversion apparatus using an active-clamp push-pull circuit.

First, a configuration and operations of the inverter according to the present embodiment will be described with reference to FIG. 1 to FIG. 4. In FIG. 1, 100 denotes a comprehensive inverter in which a current-sensor arrangement, described hereafter, is not specified. In addition, 40 denotes a comprehensive controller.

As shown in FIG. 1, the inverter 100 includes a transformer 20 that is provided with two primary coils 21 and 22, and a secondary coil 26. One end of each of the primary coils 21 and 22 is connected to a center tap 25. End portions of the primary coils 21 and 22 on the side opposite the center tap 25 are respectively referred to as switch-side end portions 23 and 24.

A high-potential side input terminal 11 and a low-potential side input terminal 12 of the inverter 100 are connected to a positive terminal and a negative terminal of a battery 10. The battery 10 serves as a direct-current power supply. An input voltage of the battery 10 is applied to the high-potential side input terminal 11 and the low-potential side input terminal 12. For example, the low-potential side input terminal 12 may be a ground-potential terminal, that is, a terminal that is grounded.

The center tap 25 of the transformer 20 is connected to the high-potential side input terminal 11 by a high-potential side line P. In addition, a path that is connected to the low-potential side input terminal 12 is referred to as a low-potential side line N. In a configuration in which the low-potential side input terminal 12 is provided, the low-potential side line N may also be referred to as a grounding line.

A smoothing capacitor C1, a first switch Q1, and a second switch Q2 are provided on a primary side of the transformer 20. The first switch Q1 and the second switch Q2 configure a basic push-pull circuit.

The smoothing capacitor C1 is connected between the high-potential side input terminal 11 and the low-potential side input terminal 12. The smoothing capacitor C1 smoothens the input voltage of the battery 10. The smoothing capacitor C1 includes a high-potential-side electrode 17 and a low-potential-side electrode 18, and has a relatively large capacity.

In addition, as a characteristic configuration according to the present embodiment, a clamp capacitor C2, a third switch Q3, and a fourth switch Q4 are provided on the primary side of the transformer 20. In the present specification, this configuration is referred to as an active-clamp push-pull circuit.

The first switch Q1 and the second switch Q2 configure a lower arm of a bridge circuit. Therefore, the first switch Q1 and the second switch Q2 are also referred to as lower-arm switches Q1 and Q2. The third switch Q3 and the fourth switch Q4 configure an upper arm of the bridge circuit. Therefore, the third switch Q3 and the fourth switch Q4 are also referred to as upper-arm switches Q3 and Q4. Furthermore, the switches in the upper and lower arms are collectively referred to as bridge-circuit switches Q1 to Q4.

For example, each of the bridge-circuit switches Q1 to Q4 is configured by a metal-oxide-semiconductor field-effect transistor (MOSFET) that has a gate terminal, a source terminal, and a drain terminal. In each of the switches Q1 to Q4, energization between the drain terminal and the source terminal occurs when a gate signal is inputted to the gate terminal. In addition, each of the switches Q1 to Q4 is provided with a body diode that allows a current that flows from the source to the drain. An insulated-gate bipolar transistor (IGBT) connected in parallel to a reflux diode or the like may also be used as each of the switches Q1 to Q4. In this case, the terminology used for the terminals in the description may be replaced as appropriate with terms such as collector and emitter.

The drain terminal of the first switch Q1 is connected to the switch-side end portion 23 of the first primary coil 21. The source terminal is connected to the low-potential side input terminal 12. The drain terminal of the second switch Q2 is connected to the switch-side end portion 24 of the second primary coil 22. The source terminal is connected to the low-potential side input terminal 12.

Figure 2:
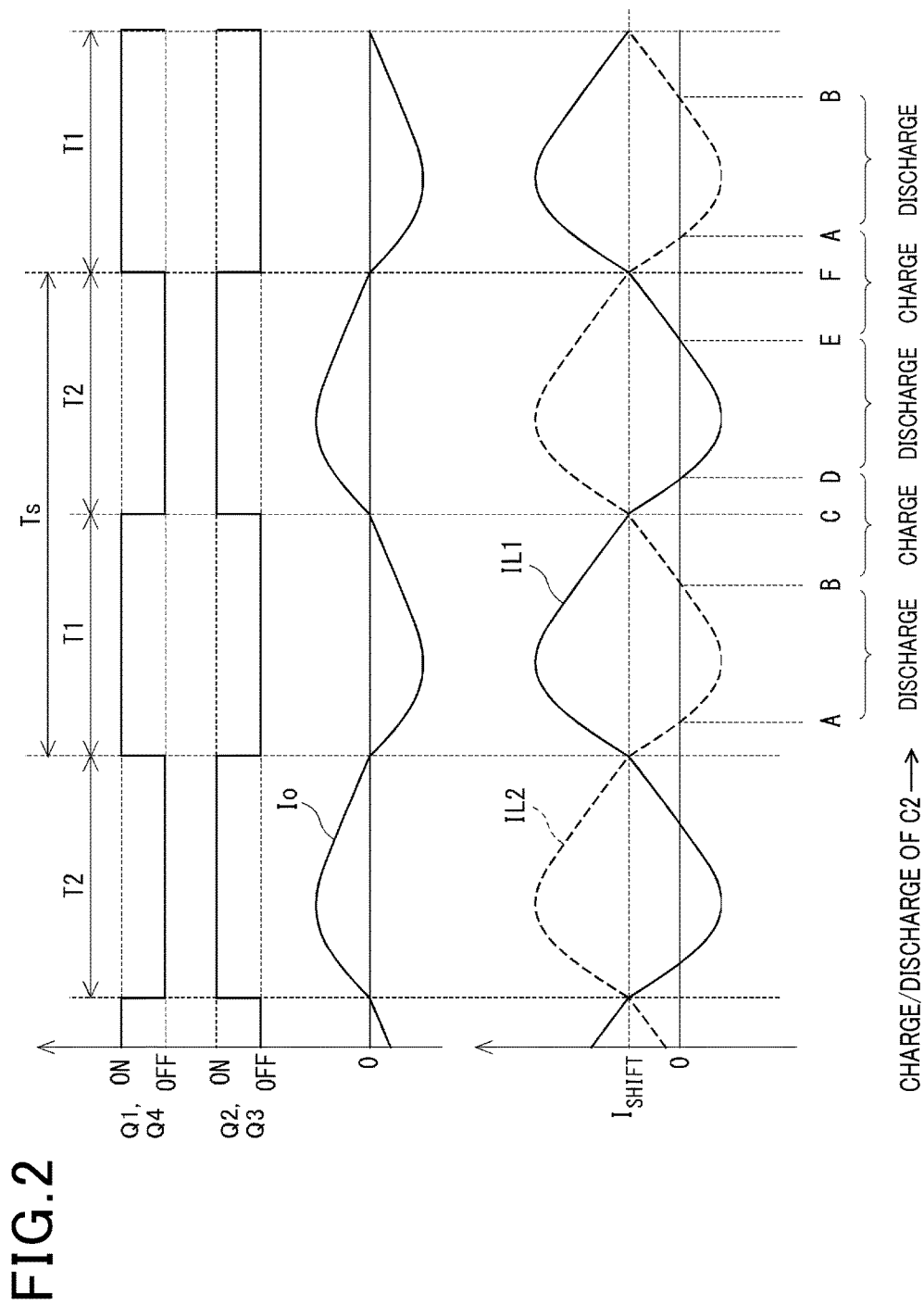
FIG. 2 is a timing chart of an operation example of the active-clamp push-pull circuit.

The first switch Q1 and the second switch Q1 alternately operate at a predetermined switching period (cycle) Ts, shown in FIG. 2 and the like. As a result, a first coil current IL1 and a second coil current IL2 flow to the first primary coil 21 and the second primary coil 22. The first coil current IL1 and the second coil current IL2 flow in opposite directions. In accompaniment, an output current Io flows to the secondary side of the transformer 20. The direction of the output current Io alternates.

The source terminal of the third switch Q3 is connected to the switch-side end portion 23 of the first primary coil 21 and the drain terminal of the first switch Q1. The source terminal of the fourth switch Q4 is connected to the switch-side end portion 24 of the second primary coil 22 and the drain terminal of the second switch Q2. The third switch Q3 and the fourth switch Q4 alternately operate at the same switching period Ts as the first switch Q1 and the second switch Q2. Details of the operation will be described hereafter.

The clamp capacitor C2 is connected between the drain terminals of the third switch Q3 and the fourth switch Q4, and the low-potential side input terminal 12. The clamp capacitor C2 includes a high-potential-side electrode 27 and a low-potential-side electrode 28. The clamp capacitor C2 supplements discharge performance of the smoothing capacitor C1 and functions to reduce ripple currents.

Electrodes 31 and 32 of a capacitive load C3 are connected to both ends of the secondary coil 26 on a secondary side of the transformer 20. For example, a discharge reactor of an ozone generation apparatus or the like is applicable as the capacitive load C3. An end portion of the secondary coil 26 on the side connected to the electrode 32 is connected to the low-potential side input terminal 12 via the low-potential side line N.

A current that flows from the high-potential side input terminal 11 to the center tap 25 via the high-potential side line P is referred to as an inverter input current Iinv. A current that flows in a direction towards the center tap 25 is defined as being positive. Hereafter, the inverter input current Iinv is simply referred to as an input current Iinv. The input current Iinv periodically varies at the switching period Ts.

A difference between a maximum value and a minimum value of the input current Iinv that appears every half period of the switching period Ts, that is, an amplitude of the input current Iinv is an input-current difference ΔIinv in theoretical terms. Meanwhile, from the perspective of control, a difference in the input current detected by an input-current sensor at the same time as a detection timing of a switch current is defined as the input-current difference ΔIinv.

In addition, currents that flow through the first switch Q1, the second switch Q2, the third switch Q3, and the fourth switch Q4 are respectively referred to as a first switch current Iq1, a second switch current Iq2, a third switch current Iq3, and a fourth switch current Iq4. A current that flows from the drain terminal to the source current in each switch is defined as being positive. In addition, a difference between the first switch current Iq1 and the second switch current Iq2 is referred to as a switch-current difference ΔIq. Details, such as the definitions of signs of the input-current difference ΔIinv and the switch-current difference ΔIq, will be described in hereafter.

In FIG. 1, the first switch current Iq1 and the second switch current Iq2 that flow through the lower-arm switches Q1 and Q2 are indicated by solid-line arrows. The third switch current Iq3 and the fourth switch current Iq4 that flow through the upper-arm switches Q3 and Q4 are indicated by dashed line arrows.

The controller 40 calculates a duty ratio that is a ratio of the on-duration of each of the bridge-current switches Q1 to Q4 relative to the switching period Ts. The controller 40 then outputs a gate signal to each of the bridge-circuit switches Q1 to Q4. The gate signal is a pulse-width modulation (PWM) signal. As basic control, the controller 40 calculates the duty ratio based on known feedback control and feed-forward control that are based on the input voltage of the battery 10 and required output of the load.

Furthermore, the controller 40 according to the present embodiment adjusts the duty ratio mainly using information on the input-current difference ΔIinv and the switch-current difference ΔIq that are based on the detection values of the input current Iinv, the first switch current Iq1, and the second switch current Iq2. Information on the switch-current difference ΔIq obtained based on the detection values of the third switch current Iq3 and the fourth switch current Iq4, instead of the detection values of the first switch current Iq1 and the second switch current Iq2, may also be used.

The technological significance of adjusting the duty ratio and a specific adjustment method will be described hereafter. In addition, specific arrangement configurations of current sensors that detect the input current and the switch currents will also be described hereafter according to each embodiment.

Next, an overview of operations of the active-clamp push-pull circuit will be described with reference to FIG. 2 to FIG. 4. In FIG. 1, a current that flows through the first primary coil 21 is a first coil current IL1. A current that flows through the second primary coil 22 is a second coil current IL2. A current that flows through the secondary coil 26 is an output current Io. Regarding the first coil current IL1 and the second coil current IL2, a direction from the center tap 25 to the switch-side end portions 23 and 24 is defined as being positive. Regarding the output current Io, a direction from the electrode 31 towards the electrode 32 of the load C3 via the secondary coil 26 is defined as being positive.

A time chart in FIG. 2 shows a relationship between the operations of the switches Q1 and Q2 and changes in the first coil current IL1, the second coil current IL2, and the output current Io.

Here, a first period T1 over which the first switch Q1 and the fourth switch Q4 are turned on, and a second period T2 over which the second switch Q2 and the third switch Q3 are turned on alternate. Dead time is ignored.

In this example, an on/off state of each switch changes at a timing at which the first coil current IL1 and the second coil current IL2 are detected and become equal at a positive switching value $I_{SHIFT}$. However, the timing at which the on/off state of the switches change is not limited thereto. The output current Io is positive when the second coil current IL2 is greater than the first coil current IL1. The output current Io is negative when the first coil current IL1 is greater than the second coil current IL2.

In the switching period Ts, timings at which the first coil current IL1 or the second coil current IL2 cross zero and timings at which the first coil current IL1 and the second coil current IL2 cross and become equal are given the symbols A to F.

At timings A and B during the first period T1, the second coil current IL2 crosses zero from positive to negative, and from negative to positive, respectively. At timing C at which the first period T1 transitions to the second period T2, the increasing second coil current IL2 and the decreasing first coil current IL1 cross.

At timings D and E during the second period T2, the first coil current IL1 crosses zero from positive to negative, and from negative to positive, respectively. At timing F at which the second period T2 transitions to the first period T1, the increasing first coil current IL1 and the decreasing second coil current IL2 cross.

FIG. 3A, FIG. 3B, FIG. 4A, and FIG. 4B show paths of the first coil current IL1 and the second coil current IL2 from timing to timing.

In the smoothing capacitor C1 and the clamp capacitor C2, arrows directed towards the high-potential-side electrodes 17 and 27 from the low-potential-side electrodes 18 and 28 indicate discharge. Arrows directed towards the low-potential-side electrodes 18 and 28 from the high-potential-side electrodes 17 and 27 indicate charging. In addition, regarding directions of the switch currents Iq1 to Iq4 that flow through the switches Q1 to Q4, a direction from the drain to the source is referred to as a forward direction. A direction from the source to the drain is referred to as a reverse direction.

Figure 3A:
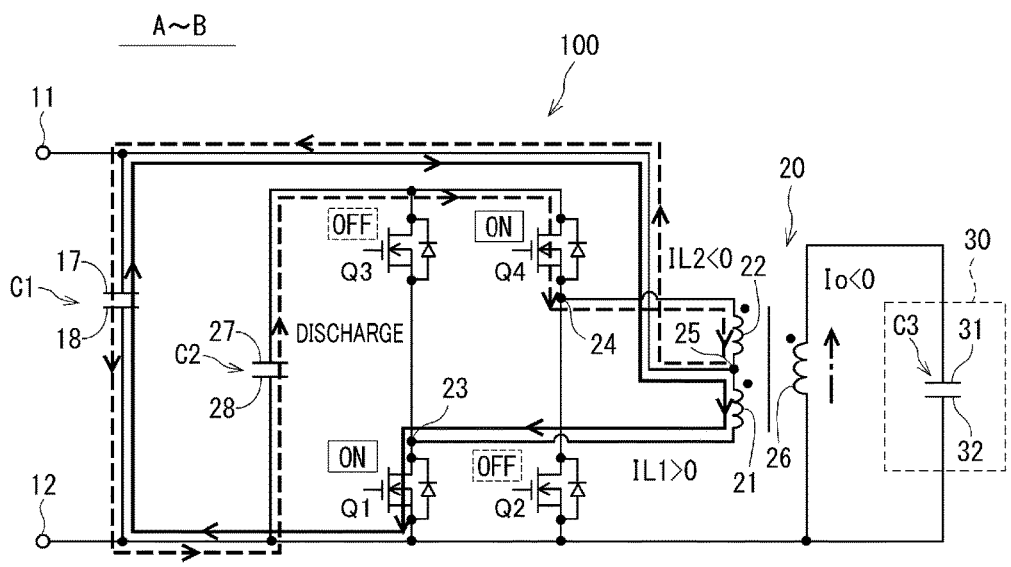
FIG. 3A is a diagram of a current path during a period from timing A to timing B shown in FIG. 2.

During the period from timings A to B shown in FIG. 3A, the positive first coil current IL1 is discharged from the smoothing capacitor C1. The first coil current IL1 then passes from the center tap 25 through the first primary coil 21, and flows through the first switch Q1 in the forward direction. The negative second coil current IL2 is discharged from the clamp capacitor C2. The second coil current IL2 then flows through the fourth switch Q4 in the forward direction, passes through the second primary coil 22 and the center tap 25, and charges the smoothing capacitor 25. During this period, the first coil current IL1 that is generated as a result of discharge of the smoothing capacitor C1 flows through the first primary coil 21, and the second coil current IL2 that is generated as a result of discharge of the clamp capacitor C1 flows through the second primary coil 22.

Figure 3B:
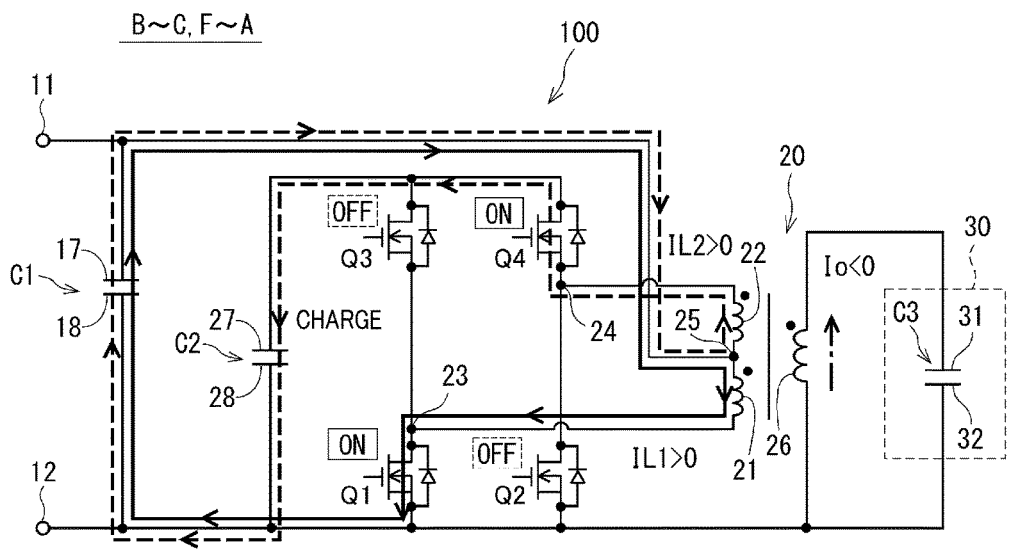
FIG. 3B is a diagram of a current path during a period from timing B to timing C shown in FIG. 2.

During the periods from timings B to C and F to A shown in FIG. 3B, the positive first coil current IL1 flows over the same path as that in FIG. 3A in the same direction as that in FIG. 3A. The positive second coil current IL2 flows over the same path as that in FIG. 3A in the direction opposite that in FIG. 3A. That is, the positive second coil current IL2 is discharged from the smoothing capacitor C1. The second coil current IL2 then passes from the center tap 25 through the second primary coil 22, flows through the fourth switch Q4 in the reverse direction, and charges the clamp capacitor C2.

Figure 4A:
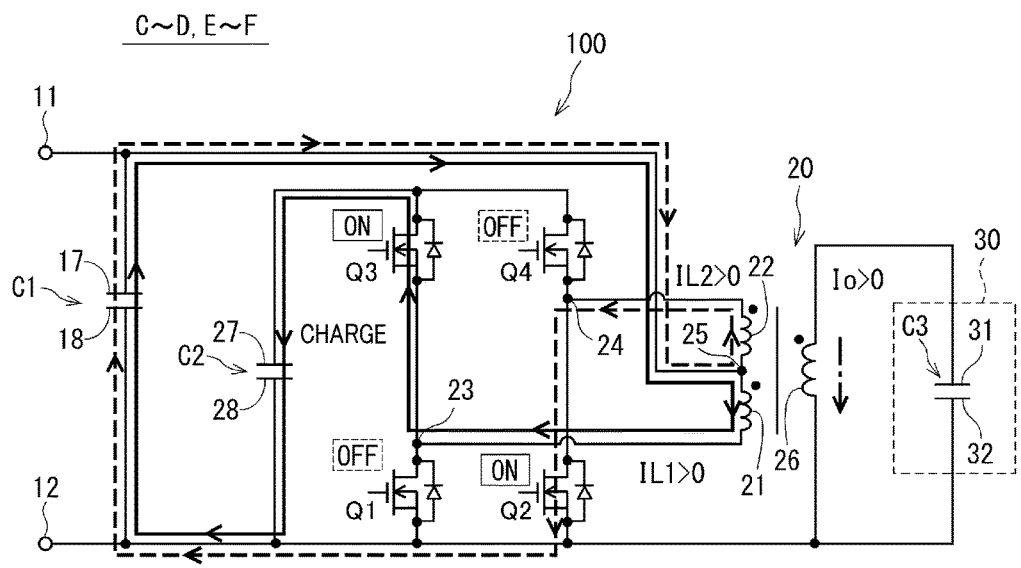
FIG. 4A is a diagram of a current path during a period from timing C to timing D shown in FIG. 2.

During the periods from timings C to D and E to F shown in FIG. 4A, the positive second coil current IL2 is discharged from the smoothing capacitor C1. The second coil current IL2 then passes from the center tap 25 through the second primary coil 22, and flows through the second switch Q2 in the forward direction. The positive first coil current IL1 is discharged from the smoothing capacitor C1. The first coil current IL2 then passes from the center tap 25 through the first primary coil 21, flows through the third switch Q3 in the reverse direction, and charges the clamp capacitor C2.

Figure 4B:
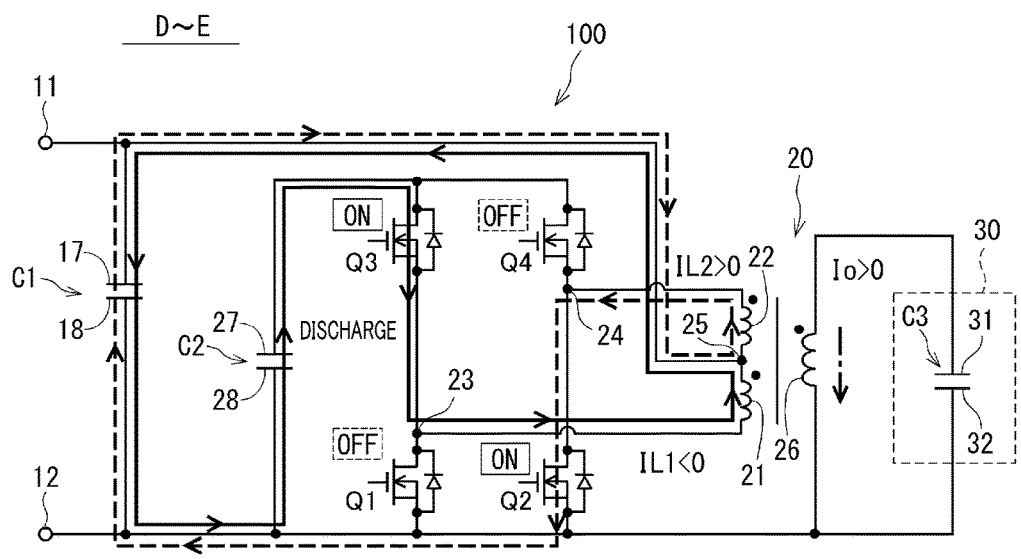
FIG. 4B is a diagram of a current path during a period from timing D to timing E shown in FIG. 2.

During the period from timings D to E shown in FIG. 4B, the positive second coil current IL2 flows over the same path as that in FIG. 4A in the same direction as that in FIG. 4A. The negative first coil current IL1 flows over the same path as that in FIG. 4A in the direction opposite that in FIG. 4A. That is, the first coil current IL1 is discharged from the clamp capacitor C2. The first coil IL1 then flows through the third switch Q3 in the forward direction, passes through the first primary coil 21 and the center tap 25, and charges the smoothing capacitor C1. During this period, the second coil current IL2 that is generated as a result of discharge of the smoothing capacitor C1 flows through the second primary coil 22, and the first coil current IL1 that is generated as a result of discharge of the clamp capacitor C2 flows through the first primary coil 21.

In a resonance inverter that uses a typical push-pull circuit that is composed only of the smoothing capacitor C1 and the lower-arm switches Q1 and Q2, the currents that flow to the first primary coil 21 and the second primary coil 22 are mainly taken from the smoothing capacitor C1. Therefore, the load placed on the smoothing capacitor C1 is significant. An issue arises in that the ripple currents tend to increase.

In this regard, in the active-clamp push-pull circuit, during the periods from timings A to B and D to E, the current that is generated as a result of discharge of the smoothing capacitor C1 and the current that is generated as a result of discharge of the clamp capacitor C2 both flow through the primary coils 21 and 22. Therefore, the load of discharge placed on the smoothing capacitor C1 is reduced. Ripple currents can be reduced.

In the active-clamp push-pull circuit, the first switch Q1 and the second switch Q2 of the lower arm alternately and equally operate. The third switch Q3 and the fourth switch Q4 of the upper arm alternately and equally operate. In addition, for the effect of supplementing discharge by the clamp capacitor C2 to be achieved, at least the fourth switch Q4 is required to be turned on during an on-period of the first switch Q1 and the third switch Q3 turned on during an on-period of the second switch Q2. Moreover, to prevent short circuits, the first switch Q1 and the third switch Q3, and the second switch Q2 and the fourth switch Q4 that form pairs between the upper and lower arms are prohibited from being simultaneously turned on.

Furthermore, in the active-clamp push-pull circuit, when a state in which the first switch Q1 and the second switch Q2 are simultaneously turned on or the third switch Q3 and the fourth switch Q4 are simultaneously turned on occurs, magnetic flux is canceled between the primary coils 21 and 22 of the transformer 20. As a result, power is not outputted to the secondary side and a large current flows on the primary side. Therefore, to prevent this situation, the first switch Q1 and the second switch Q2 of the lower arm are prevented from being simultaneously turned on. The third switch Q3 and the fourth switch Q4 of the upper arm are also prevented from being simultaneously turned on. As a result, an abnormal current is prevented from flowing to the primary side. Power is appropriately outputted to the load C3 on the secondary side.

Next, the issue of biased magnetization currents in a power conversion apparatus that typically uses a push-pull circuit and the principle behind the solution for the issue according to the present embodiment will be described with reference to FIG. 5 to FIG. 8.

First, the biased magnetization phenomenon will be described with reference to FIG. 5.

Figure 5:
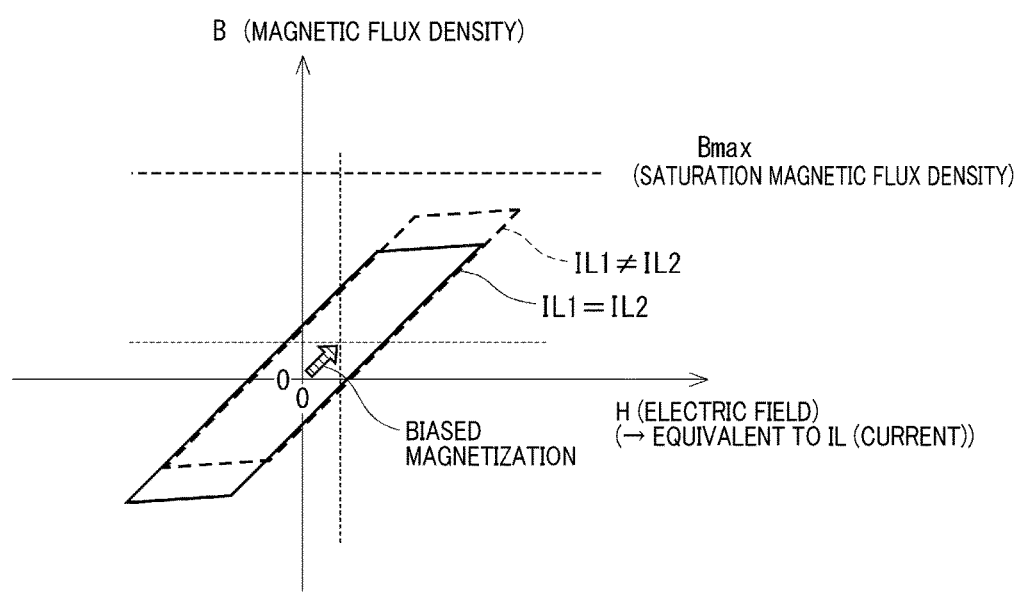
FIG. 5 is a diagram for explaining a biased magnetization phenomenon.

FIG. 5 shows a relationship between electric field H and magnetic flux density B. The electric field H can be considered to be equivalent to the coil current IL. When the first coil current IL1 and the second coil current IL2 flowing to the primary coils 21 and 22 of the transformer 20 are equal, characteristic lines of the electric field H and the magnetic flux density B appear symmetrical relative to a point of origin, as indicated by the solid lines.

However, when an imbalance occurs between the first coil current IL1 and the second coil current IL2 as a result of biased magnetization, the characteristic lines of the electric field H and the magnetic flux density B shift to one side as indicated by the dashed lines. If the magnetic flux density B becomes equal to or greater than a saturation magnetic flux density Bmax, inductance (that is, magnetic resistance) becomes zero. Thus, a short-circuit current is generated. In a worst case scenario, the circuit may be destroyed.

To suppress biased magnetization, average currents IL1ave and IL2ave of the first primary coil 21 and the second primary coil 22, that is, direct-current components of excitation currents are required to be equal. Here, factors that cause biased magnetization include a factor (hereinafter referred to as a first factor) that is attributed to variations in internal resistance in the current paths and the on-durations of the bridge-circuit switches Q1 to Q4, and a factor (hereinafter referred to as a second factor) attributed to variations in primary-side leakage inductance.

Figure 6:
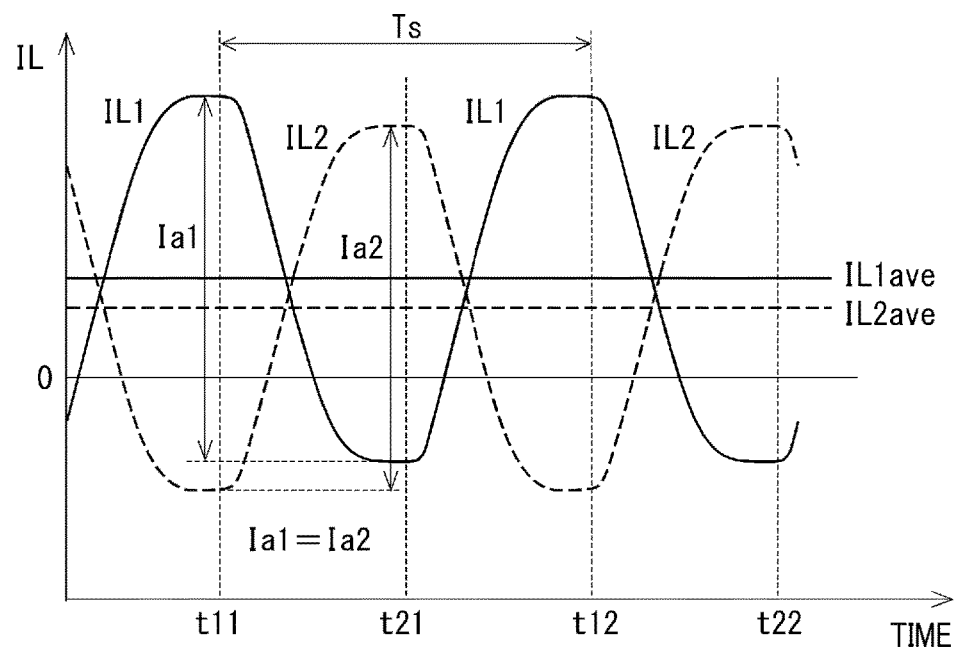
FIG. 6 is a diagram for explaining behaviors of coil currents caused by a factor attributed to variations in internal resistance and on-durations.

As shown in FIG. 6, in the case of the first factor, current amplitudes Ia1 and Ia2 of the first coil current IL1 and the second coil current IL2 are equal and have an overall offsetting relationship. In this case, the difference between the average currents IL1ave and IL2ave of the primary coils 21 and 22 can be made zero by the peak values of the first coil current IL1 and the second coil current IL2 being matched. Therefore, for example, biased magnetization suppression control can be performed by the conventional technology described in JP-A-H05-68381. Here, timings t11, t21, t12, and t22 on a time axis shown in FIG. 6 to FIG. 8 are provided in correspondence with FIG. 9, described hereafter, and are not used in the present description.

Figure 7:
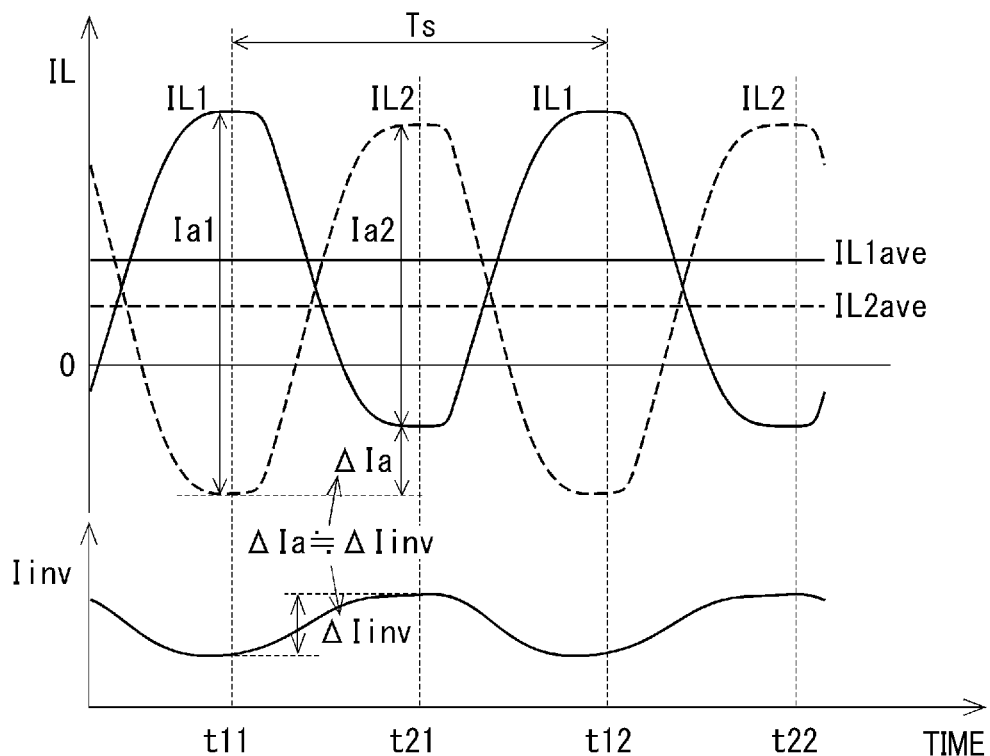
FIG. 7 is a diagram for explaining behaviors of coil currents caused by a factor attributed to variations in leakage inductance.

Meanwhile, as shown in FIG. 7, in the case of the second factor, an amplitude difference $\Delta Ia$ (=Ia1−Ia2) occurs between the current amplitude Ia1 of the first coil current IL1 and the current amplitude Ia2 of the second coil current IL1. In the example in FIG. 7, the relationship between the current amplitudes Ia1 and Ia2 is Ia1>Ia2. In this case, even if the peak values of the coil currents IL1 and IL2 are matched, the difference between the average currents IL1ave and IL2ave of the primary coils 21 and 22 cannot be made zero.

Figure 8A:
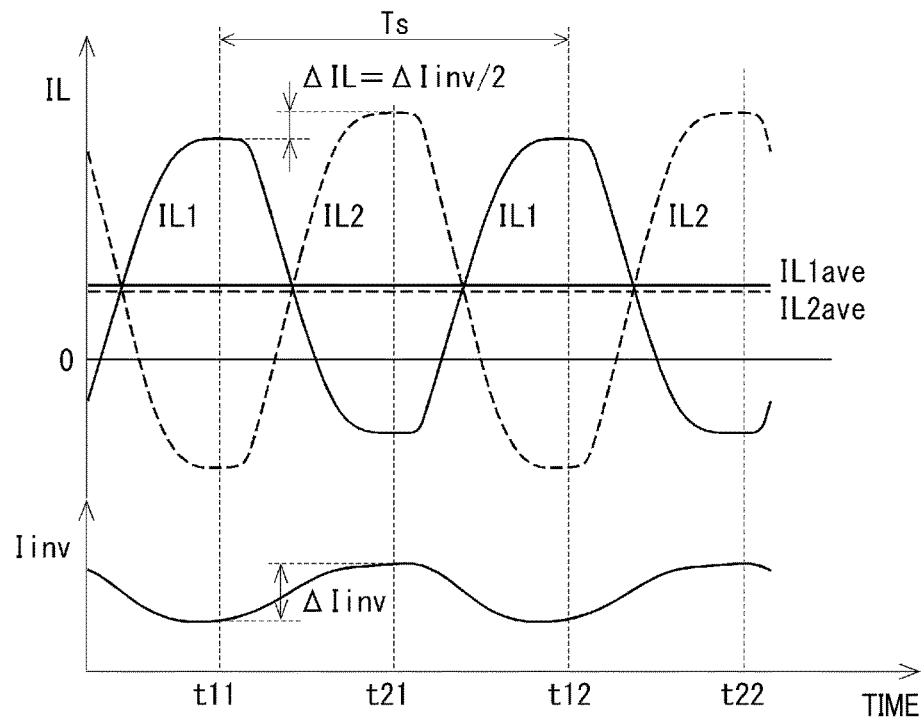
FIG. 8A is a diagram for explaining the principles of biased magnetization suppression control based on a coil-current difference.

Therefore, the present embodiment focuses on the difference $\Delta Ia$ in current amplitude caused by variations in leakage inductance appearing the amplitude of the input current Iinv. In addition, as shown in FIG. 8A, according to the present embodiment, the aim is to perform control such that a difference $\Delta IL$ in the peak values of the second coil current IL2 and the first coil current IL1 is half (½) of the input-current difference $\Delta Iinv$, that is, such that expression (1.1) is satisfied.

$$\Delta IL = \Delta Iinv/2 \quad (1.1)$$

In addition, under an assumption that the signs of the currents are appropriately set, the foregoing may be expressed by expression (1.2) using absolute values.

$$|IL1-IL2|=|\Delta Iinv|/2 \quad (1.2)$$

As a result of control being performed in this manner, imbalance between the average currents IL1ave and IL2ave is suppressed. The difference between the average currents IL1ave and IL2ave becomes closer to zero.

In this control, although effects caused by variations in the on-durations of the switches Q1 to Q4 and the like appear in the input current Iinv, these effects are eliminated as a result of the on-durations being adjusted by biased magnetization control. Meanwhile, variations in leakage inductance remain even when the direct-current components of the excitation currents are eliminated. Therefore, the variations in leakage inductance can be used for biased magnetization control.

Figure 8B:
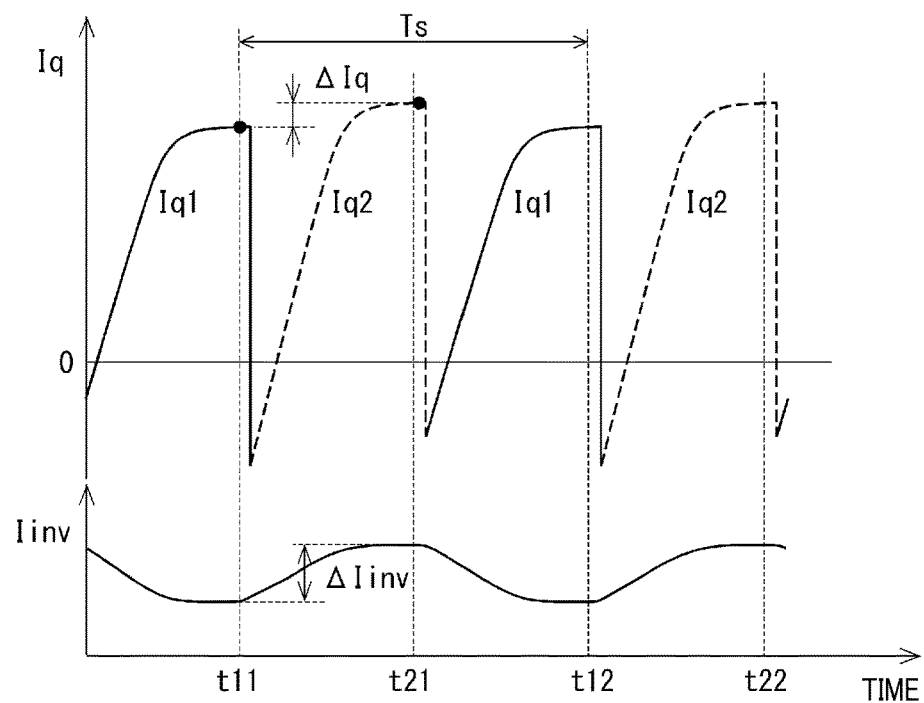
FIG. 8B is a diagram for explaining the principles of biased magnetization suppression control based on a switch-current difference.

In addition, as shown in FIG. 8B, control may be performed such that the switch-current difference $\Delta Iq$ that is the difference between the first switch current Iq1 and the second switch current Iq2 becomes half of the input-current difference $\Delta Iinv$, instead of the difference $\Delta IL$ between the coil currents IL1 and IL2. That is, control may be performed such that expression (2.1) is satisfied.

$$\Delta Iq = \Delta Iinv/2 \quad (2.1)$$

In addition, under an assumption that the signs of the currents are appropriately set, the foregoing may be expressed by expression (2.2) using absolute values.

$$|Iq1-Iq2|=|\Delta Iinv|/2 \quad (2.2)$$

Figure 11:
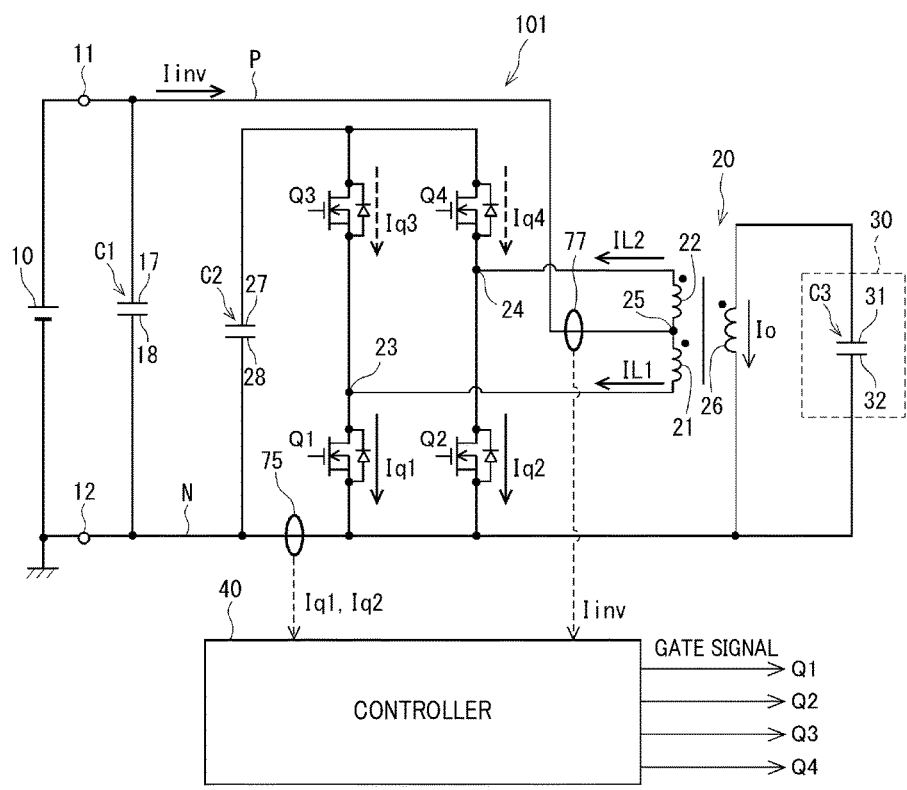
FIG. 11 is a diagram of an arrangement position of a switch-current sensor in an inverter according to a first embodiment.

For example, when an arrangement configuration of a switch-current sensor 75 shown in FIG. 11 is used, the first switch current Iq1 and the second switch current Iq2 can be detected by a single current sensor.

According to the present embodiment, biased magnetization suppression of the first primary coil 21 and the second primary coil 22 is achieved by the duty ratios of the first switch Q1 and the second switch Q2 being adjusted so as to satisfy the expression (2.1). Here, the expression (2.1) is rewritten as $\Delta Iq=0.5 \times \Delta Iinv$. A coefficient 0.5 of the input-current difference $\Delta Iinv$ is defined as a target ratio $\alpha$.

The target ratio $\alpha$ is a ratio of the switch-current difference $\Delta Iq$ to the input-current difference $\Delta Iinv$. The signs of the switch-current difference $\Delta Iq$ and the input-current difference $\Delta Iinv$ are defined such that the target ratio $\alpha$ is a positive value. The controller 40 according to the present embodiment adjusts the duty ratios of the bridge-circuit switches Q1 to Q4 such that the switch-current difference $\Delta Iq$ becomes closer to a value obtained by the input-current difference $\Delta Iinv$ being multiplied by the target ratio $\alpha$.

According to the embodiments below, the target ratio $\alpha$ is described as ideally being 0.5. However, in actual control, the target ratio $\alpha$ is not necessarily strictly 0.5, because of detection errors in the current sensors, resolution of control apparatuses, and the like. Therefore, the range of the target ratio $\alpha$ may be interpreted as being expanded to a range of which 0.5 is the center. In this case, a range in which $0<\alpha<1$ is assumed as rational upper and lower limits. When $\alpha=0$, the information on the input-current difference $\Delta Iinv$ is essentially unused. When $\alpha=1$, the state in FIG. 7 is simply maintained as it is. Therefore, for the technological concept according to the present embodiment to be reflected, at least a condition that $0<\alpha<1$ is required to be met. As a result of the target ratio $\alpha$ being controlled within the range of $0<\alpha<1$, a biased magnetization suppression effect that corresponds to that when the target ratio $\alpha$ is ideally controlled such that $\alpha=0$ is actualized.

Figure 9:
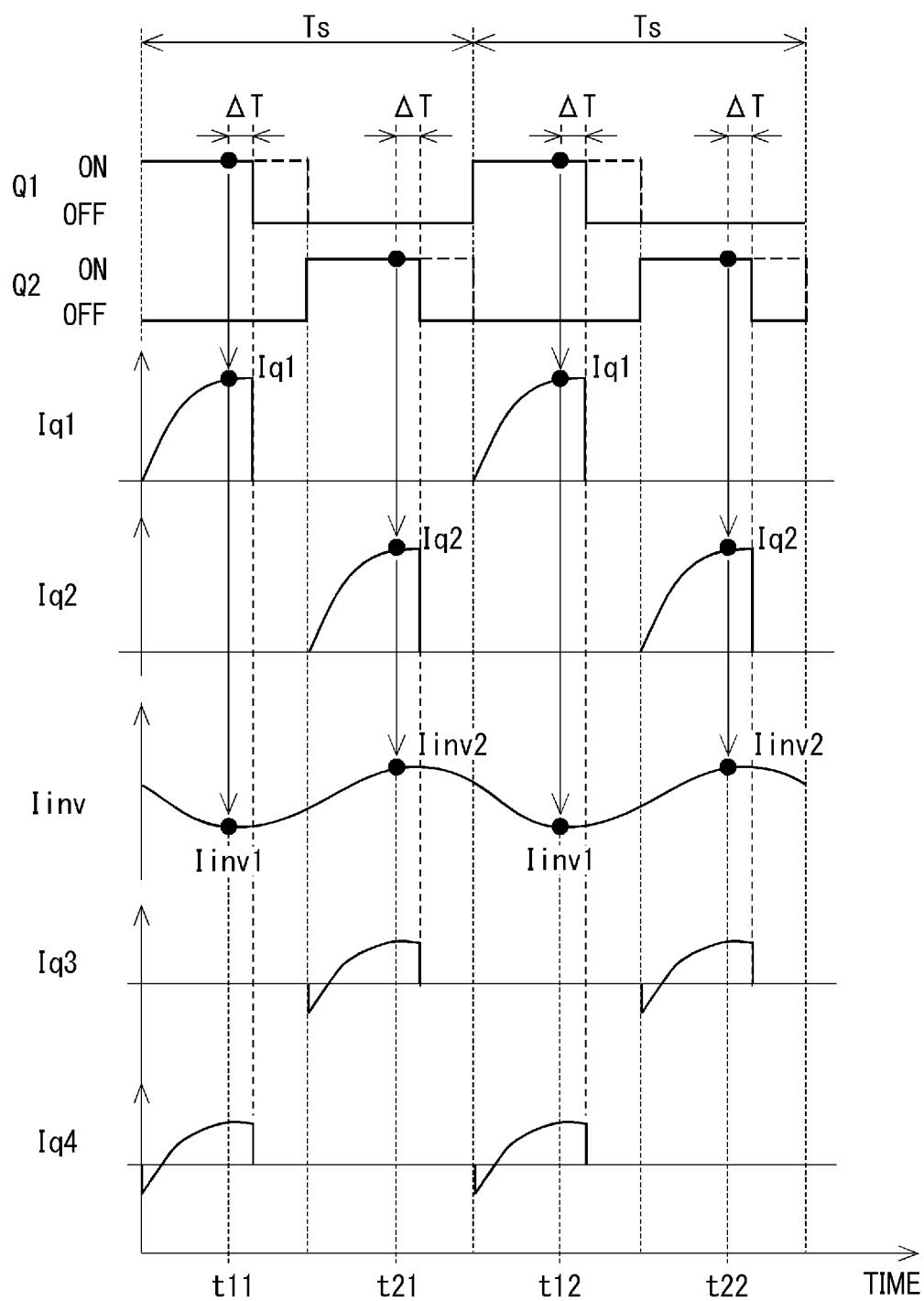
FIG. 9 is a diagram of a configuration for detecting currents at a timing immediately before a switch is turned off.
Figure 10:
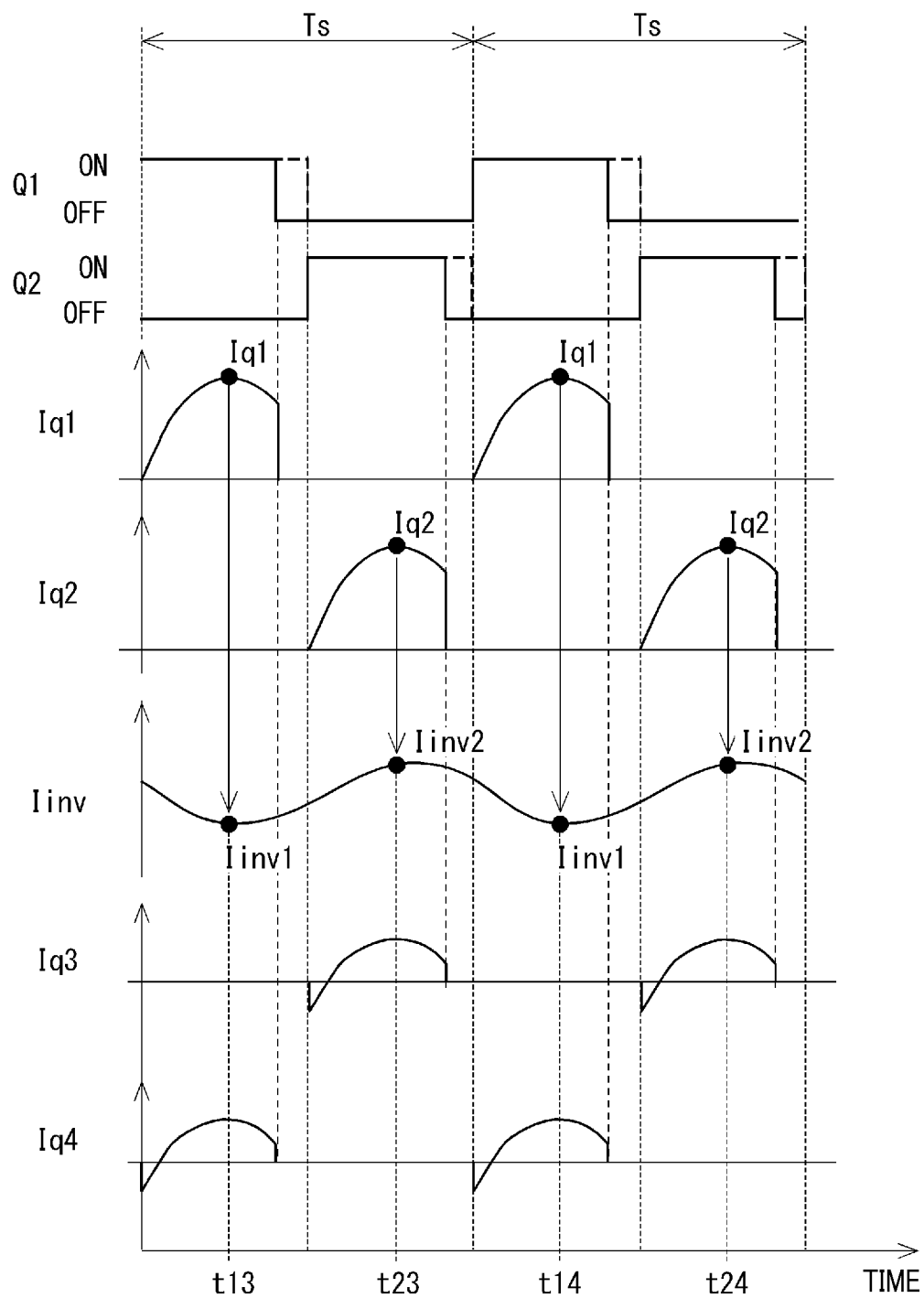
FIG. 10 is a diagram of a configuration for detecting currents at a timing at which a switch current reaches a peak.

Next, detection timings of the switch currents Iq1 and Iq2, and the input current Iinv will be described with reference to FIG. 9 and FIG. 10. In FIG. 9 and FIG. 10, changes over time in the gate signals of the first and switches Q1 and Q2, the first and second switch signals Iq1 and Iq2, the input current Iinv, and the third and fourth switch signals Iq3 and Iq4 are shown in this order from the top.

In this example, the duty ratios of the first switch Q1 and the fourth switch Q4, and the duty ratios of the second switch Q2 and the third switch Q3 are both set to be equal. During the on-period of the first switch Q1 and the fourth switch Q4, the first switch signal Iq1 and the fourth switch signal Iq4 both gradually increase. In addition, during the on-period of the second switch Q2 and the third switch Q3, the second switch signal Iq2 and the third switch signal Iq3 both gradually increase. A dashed line of the gate signal is expressed with reference to a state in which the duty ratio of each of the switches Q1 and Q2 is a maximum of 50%. In addition, in the descriptions of FIG. 9 and FIG. 10, reference numbers of the switch-current sensor 75 and an input-current sensor 77 in a sensor arrangement according to a first embodiment shown in FIG. 11 are used as the reference numbers of the switch-current sensor and the input-current sensor.

In the configuration shown in FIG. 9, the switch currents Iq1 and Iq2, and the input current Iinv are detected at timings immediately before the switches Q1 and Q2 are turned off, that is, a predetermined minute amount of time $\Delta T$ before the off-timings of the switches Q1 and Q2. For example, the predetermined minute amount of time $\Delta T$ is set to about one-tenth of the switching period Ts.

Specifically, in FIG. 9, at timings t11 and t12, the input-current sensor 77 detects an input current Iinv1 at the same time the switch-current sensor 75 detects the first switch current Iq1. In addition, at the timings t12 and t22, the input-current sensor 77 detects an input current Iinv2 at the same time the switch-current sensor 75 detects the second switch current Iq2.

If the currents are detected simultaneously with the off-timings of the switches Q1 and Q2, switching noise may affect the detection. Therefore, as a result of the currents being detected at a timing that is the predetermined minute amount of time $\Delta T$ before the off-timing, the effect of switching noise can be avoided. Here, the input current Iinv1 corresponds to a substantially minimum value of the input current Iinv. The input current Iinv2 corresponds to a substantially maximum value of the input current Iinv. Therefore, the input-current difference $\Delta Iinv$ substantially coincides with the amplitude of the input current Iinv. The timings t11, t12, t21, and t22 in FIG. 9 are also reflected in FIG. 6 to FIG. 8, described above.

Meanwhile, in the configuration shown in FIG. 10, the switch-current sensor 75 detects the switch currents Iq1 and Iq2 at timings at which the switch currents Iq1 and Iq2 reach a peak. The input-current sensor 77 detects the input current Iinv1 simultaneously with timings t13 and t14 at which the switch-current sensor 75 detects the first switch current Iq1. In addition, the input-current sensor 77 detects the input current Iinv2 simultaneously with timings t23 and t24 at which the switch-current sensor 75 detects the second switch current Iq2. In this configuration, the peak values of the switch currents Iq1 and Iq2 can be stably detected regardless of variations in the duty ratio.

Next, arrangement positions of the switch-current sensor and the input-current sensor in the inverter 100 or a specific configuration of duty ratio adjustment performed by the controller 40 will be described according to each embodiment. According to embodiments related to the arrangement positions of the current sensors, regarding the reference number of the inverter, the embodiment number (1, 4, 5, 6, or 7) is added as a third digit following 10 (i.e., 101, 104, 105, 106, or 107). In addition, according to embodiments related to duty ratio adjustment, regarding the reference number of the controller, the embodiment number (1, 2, 3, or 6) is added as a third digit following 40 (i.e., 401, 402, 403, or 406).

First Embodiment

FIG. 11 shows arrangement positions of the current sensors in an inverter 101 according to the first embodiment. In the drawings of the inverter according to the embodiments, the input voltage and the required output that are inputted to the controller 40 in FIG. 1 are omitted.

As shown in FIG. 11, in the inverter 101 according to the first embodiment, the switch-current sensor 75 is provided between a connection point of the source terminals of the first switch Q1 and the second switch Q2, and the low-potential-side electrode 28 of the clamp capacitor C2. The switch-current sensor 75 alternately detects the first switch current Iq1 and the second switch current Iq2 at every half period of the switching period Ts. As a result, a current sensor can be eliminated compared to a configuration according a fourth embodiment. In addition, effects of offset error between two current sensors can be avoided.

The input-current sensor 77 is provided on the high-potential side line P between the center tap 25 of the transformer 20 and the smoothing capacitor C1.

Figure 12:
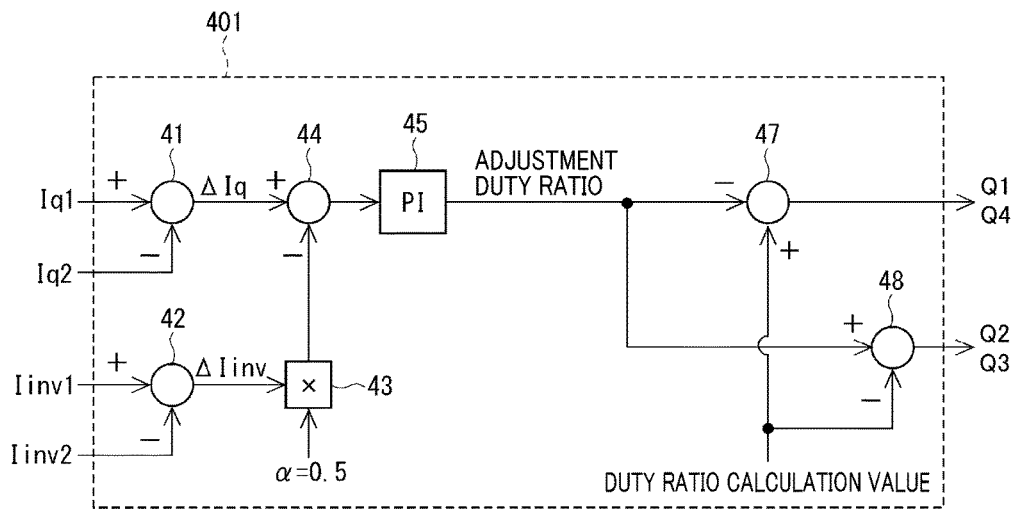
FIG. 12 is a control block diagram of duty ratio adjustment by a controller in the inverter according to the first embodiment.

FIG. 12 shows a configuration of the duty ratio adjustment performed by a controller 401 according to the first embodiment.

The controller 401 includes a switch-current difference calculator 41, an input-current difference calculator 42, a target ratio multiplier 43, a deviation calculator 44, a proportional-integral (PI) controller 45, a first-switch duty ratio adjuster 47, and a second-switch duty ratio adjuster 48.

The switch-current difference calculator 41 calculates the switch-current difference $\Delta Iq$ obtained by subtracting the second switch current Iq2 from the first switch current Iq1. The input-current difference calculator 42 calculates the input-current difference $\Delta Iinv$ obtained by subtracting the input current Iinv2 detected simultaneously with the second switch current Iq2 from the input current Iinv1 detected simultaneously with the first switch current Iq1. The target ratio multiplier 43 multiplies the input-current difference $\Delta Iinv$ by 0.5, which is the target ratio $\alpha$.

The deviation calculator 44 calculates a deviation between the switch-current difference $\Delta Iq$ and the value obtained by multiplying the input-current difference $\Delta Iinv$ by 0.5. The PI controller 45 calculates an adjustment duty ratio by PI control such that the deviation becomes closer to zero.

The first-switch duty ratio adjuster 47 outputs a value obtained by subtracting the adjustment duty ratio from the duty ratio calculation value to the first switch Q1 and the fourth switch Q4. The second-switch duty ratio adjuster 48 outputs a value obtained by adding the adjustment duty ratio to the duty ratio calculation value to the second switch Q2 and the third switch Q3. For example, when the first switch current Iq1 is greater than the second switch current Iq2 (that is, $\Delta Iq>0$) and the adjustment duty ratio is positive, adjustment is made such that the duty ratio of the first switch Q1 decreases and the duty ratio of the second switch Q2 increases.

Here, the duty ratio calculation value may be a value calculated by feedback control or feed-forward control. Alternatively, the duty ratio calculation value may be a fixed value. In addition, the adjusted duty ratio may be outputted to only the first switch Q1 and the second switch Q2. The third switch Q3 and the fourth switch Q4 may be driven using the duty ratio calculation value before adjustment. That is, the controller 401 may adjust only the duty ratios of the lower-arm switches Q1 and Q2.

The controller 401 according to the first embodiment is capable of setting a biased magnetization current to zero by increasing or decreasing the duty ratio of each of the lower-arm switches Q1 and Q2.

Next, second and third embodiments will be described with reference to FIG. 13 and FIG. 14. According to the second and third embodiments, the configuration related to the duty ratio adjustment of the bridge-circuit switches Q1 to Q4 by the controller differs from that according to the first embodiment. The description according to the first embodiment is applicable regarding noted matters other that those described below.

Second Embodiment

Figure 13:
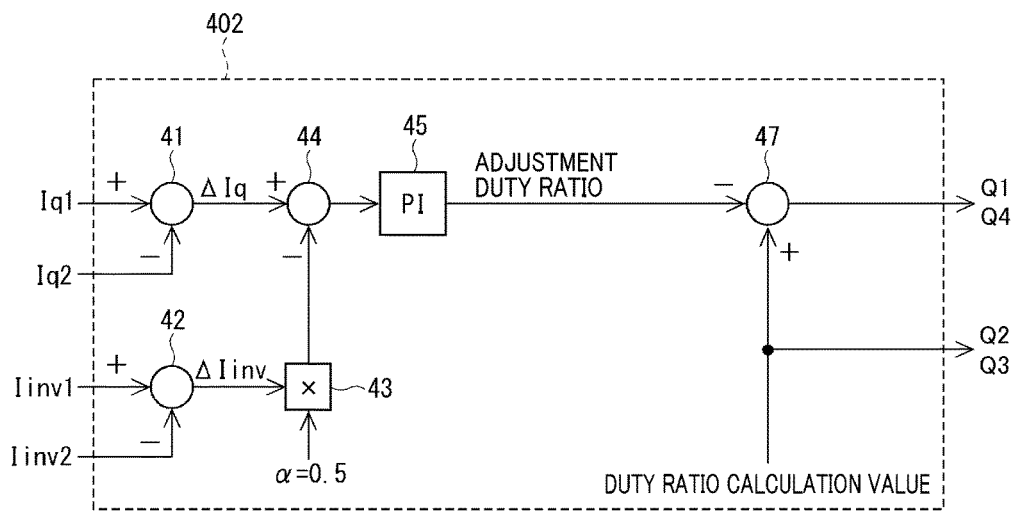
FIG. 13 is a control block diagram of duty ratio adjustment by a controller in an inverter according to a second embodiment.

A controller 402 according to the second embodiment shown in FIG. 13 increases or decreases the duty ratio of either of the first switch Q1 and the second switch Q2. In the example in FIG. 13, the controller 402 outputs a value obtained by subtracting the adjustment duty ratio from the duty ratio calculation value to only the pair of switches composed of the first switch Q1 and the fourth switch Q4. Meanwhile, the controller 402 outputs the duty ratio calculation value as it is to the pair of switches composed of the second switch Q2 and the third switch Q3. That is, the controller 402 adjusts the duty ratios of only one of the pairs of switches, that is, the pair composed of the first switch Q1 and the fourth switch Q4. As opposed to the example in FIG. 13, the duty ratios of only the pair of switches composed of the second switch Q2 and the third switch Q3 may be adjusted. According to the second embodiment, because only the adjustment of the duty ratios of the switches in either of the pairs is required, control is simplified.

Third Embodiment

Figure 14:
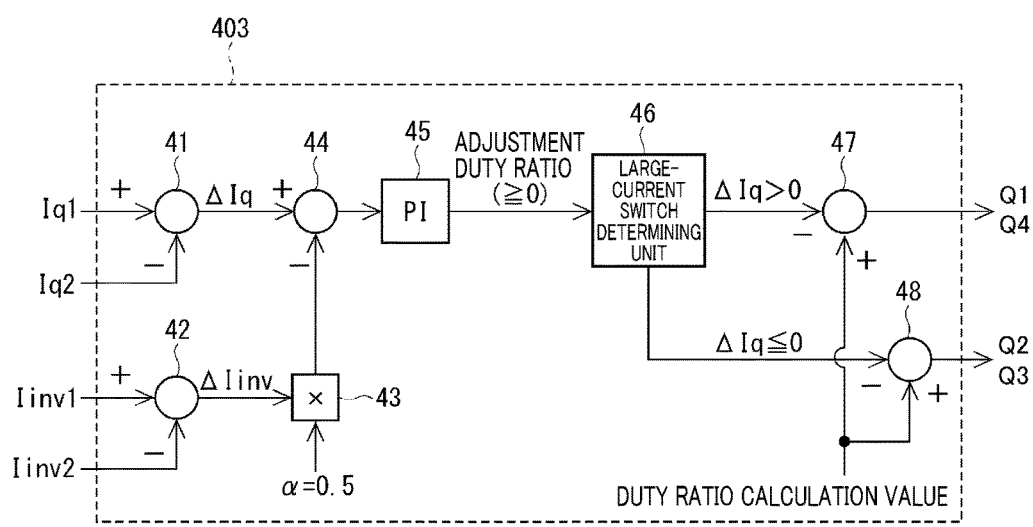
FIG. 14 is a control block diagram of duty ratio adjustment by a controller in an inverter according to a third embodiment.

A controller 403 according to the third embodiment shown in FIG. 14 further includes a large-current switch determining unit 46. The large-current switch determining unit 46 determines the switch that has a larger switch current, of the first switch Q1 and the second switch Q2. The controller 403 decreases the duty ratio of the switch that has the larger switch current determined by the large-current switch determining unit 46. Here, the adjustment duty ratio calculated by the PI controller 45 is outputted as an absolute value, that is, zero or a positive value.

The large-current switch determining unit 46 determines whether or not the switch-current difference $\Delta Iq$ is greater than zero. When $\Delta Iq>0$ (that is, Iq1>Iq2), a value obtained by the adjustment duty ratio being subtracted from the duty ratio calculation value is outputted to the pair of switches composed of the first switch Q1 and the fourth switch Q4. When $\Delta Iq\leq$(that is, Iq1$\leq$Iq2), a value obtained by the adjustment duty ratio being subtracted from the duty ratio calculation value is outputted to the pair of switches composed of the second switch Q2 and the third switch Q3.

According to the third embodiment, the duty ratio is adjusted so as to decrease, at all times. Therefore, change is made so as to increase dead time. Safety is ensured.

Figure 15:
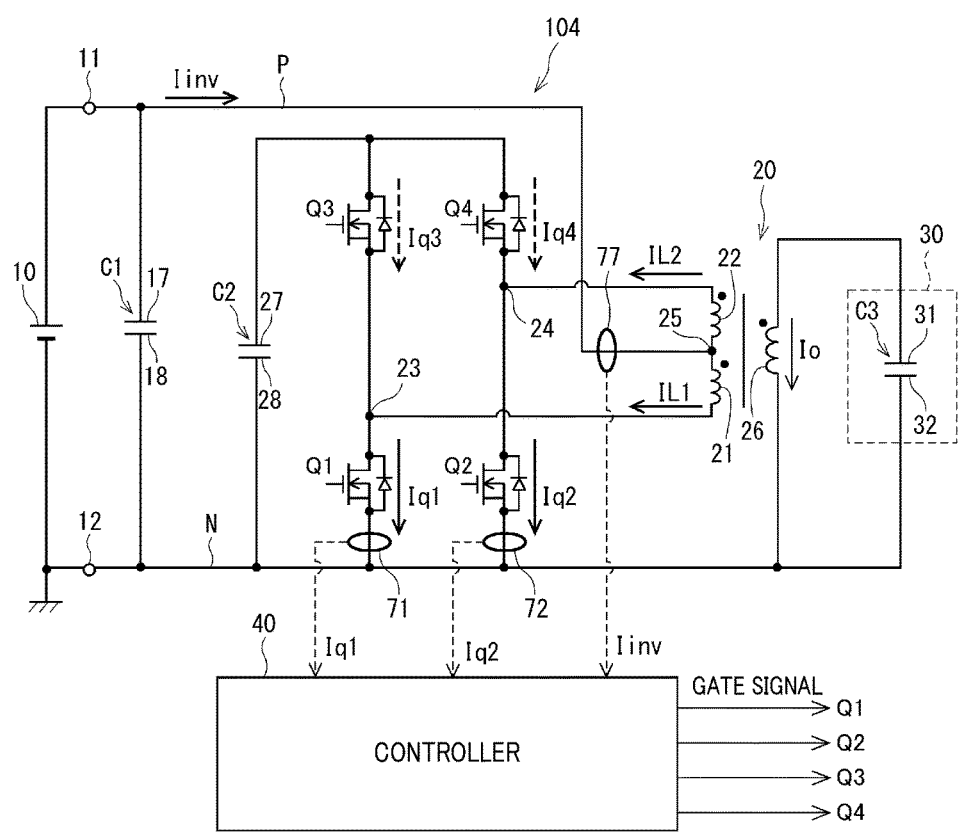
FIG. 15 is a diagram of arrangement positions of switch-current sensors in an inverter according to a fourth embodiment.

Next, fourth and fifth embodiments will be described with reference to FIG. 15 and FIG. 16. According to the fourth and fifth embodiments, an arrangement position of the switch-current sensor or the input-current sensor differs from that according to the first embodiment.

Fourth Embodiment

As shown in FIG. 14, in an inverter 104 according to the fourth embodiment, switch-current sensors 71 and 72 are respectively provided on the source side of the first switch Q1 and the source side of the second switch Q2. The switch-current sensor 71 detects the first switch current Iq1. The switch-current sensor 72 detects the second switch current Iq2. The switch-current sensors may be provided on the drain side of the switches Q1 and Q2, rather than the source side.

According to the fourth embodiment, detection of malfunctions in the first switch Q1 and the second switch Q2 can also be performed based on the switch currents Iq1 and Iq2 that are individually detected.

Fifth Embodiment

Figure 16:
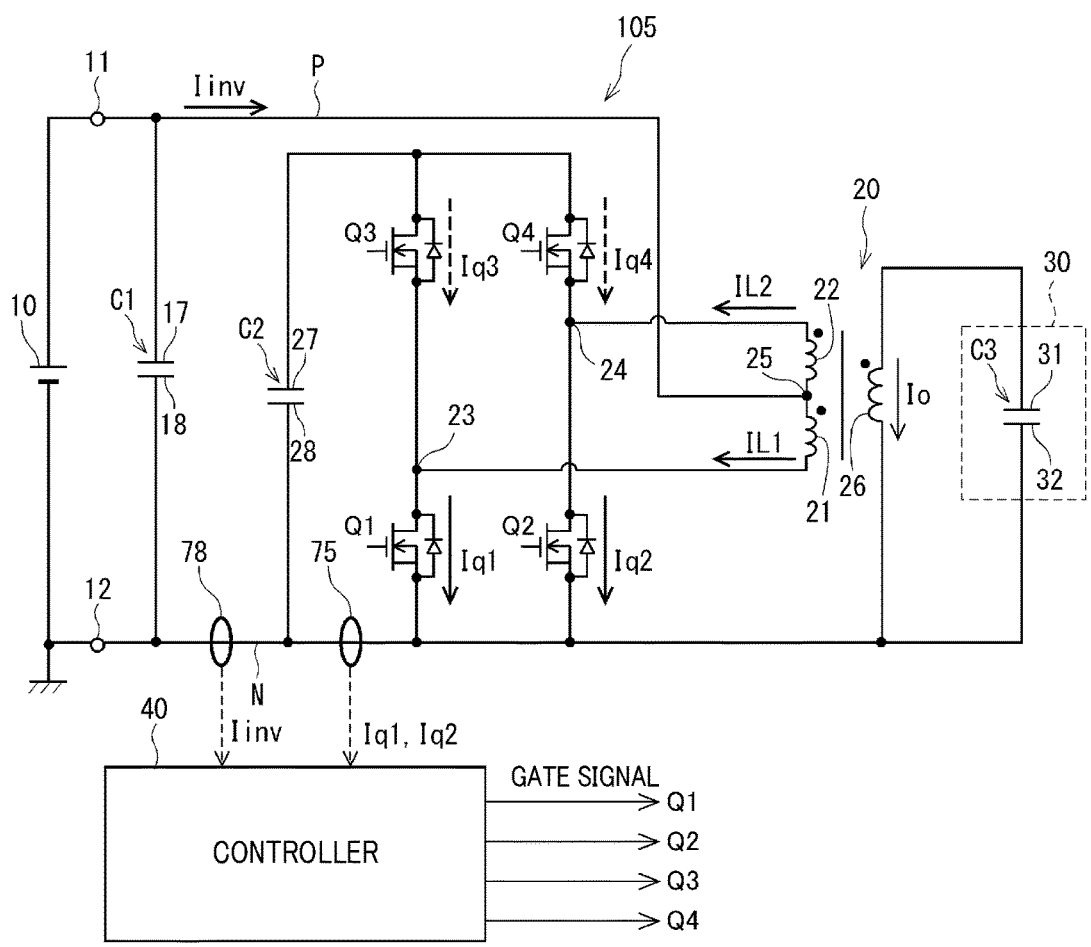
FIG. 16 is a diagram of an arrangement position of an input-current sensor in an inverter according to a fifth embodiment.

As shown in FIG. 16, in an inverter 105 according to the fifth embodiment, an input-current sensor 78 is provided between the low-potential-side electrode 28 of the clamp capacitor C2 and the low-potential side input terminal 12. In this configuration, current detection can be performed at ground potential. Therefore, the input-current sensor 78 is not required to perform high-side sensing. A low-side current sensor can be used.

The input-current sensor 78 may be combined not only with the switch-current sensor 75 according to the first embodiment shown in the example in FIG. 16, but also with switch-current sensors provided in any position.

Sixth Embodiment

The sixth embodiment will be described with reference to FIG. 17 to FIG. 19.

Figure 17:
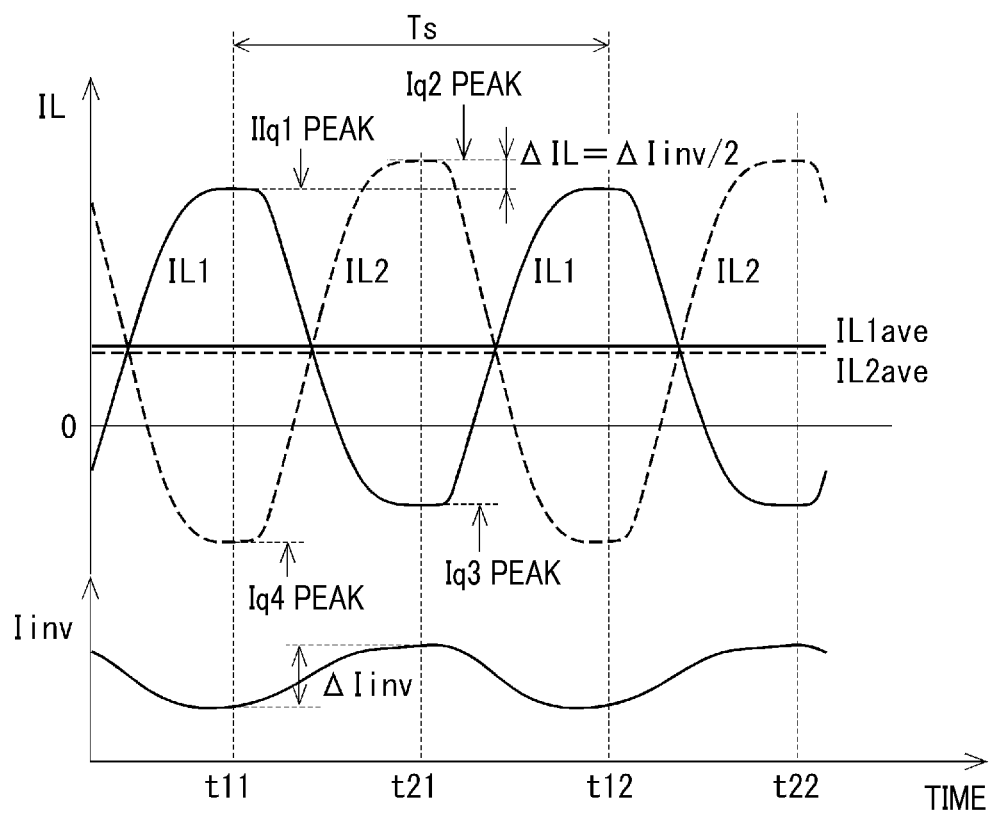
FIG. 17 is a diagram for explaining a configuration for performing biased magnetization control based on a switch-current difference in an upper arm.

FIG. 17 is essentially identical to FIG. 8A. In FIG. 17, the peak of the first coil current IL1 on the positive side corresponds to the peak of the first switch current Iq1. The peak of the first coil current IL1 on the negative side corresponds to the peak of the third switch current Iq3. The peak of the second coil current IL2 on the positive side corresponds to the peak of the second switch current Iq2. The peak of the second coil current IL2 on the negative side corresponds to the peak of the fourth switch current Iq4. Here, regarding the third switch current Iq3 and the fourth switch current Iq4, the negative direction of the coil currents IL1 and IL2, that is, a downward direction in FIG. 17, is positive. Therefore, expression (3.1) is established upon suppression of biased magnetization.

$$Iq1-Iq2=Iq3-Iq4 \qquad (3.1)$$

In addition, under an assumption that the signs of the currents are appropriately set, the foregoing may be expressed by expression (3.2) using absolute values.

$$|Iq1-Iq2|=|Iq3-Iq4| \qquad (3.2)$$

According to the sixth embodiment, based on the foregoing relationship, the third and fourth switch currents Iq3 and Iq4 of the upper arm are detected instead of the first and second switch currents Iq1 and Iq2 of the lower arms being detected. The switch-current difference $\Delta Iq$ is calculated based on the difference (Iq3−Iq4) between the third and fourth switch currents Iq3 and Iq4.

Figure 18:
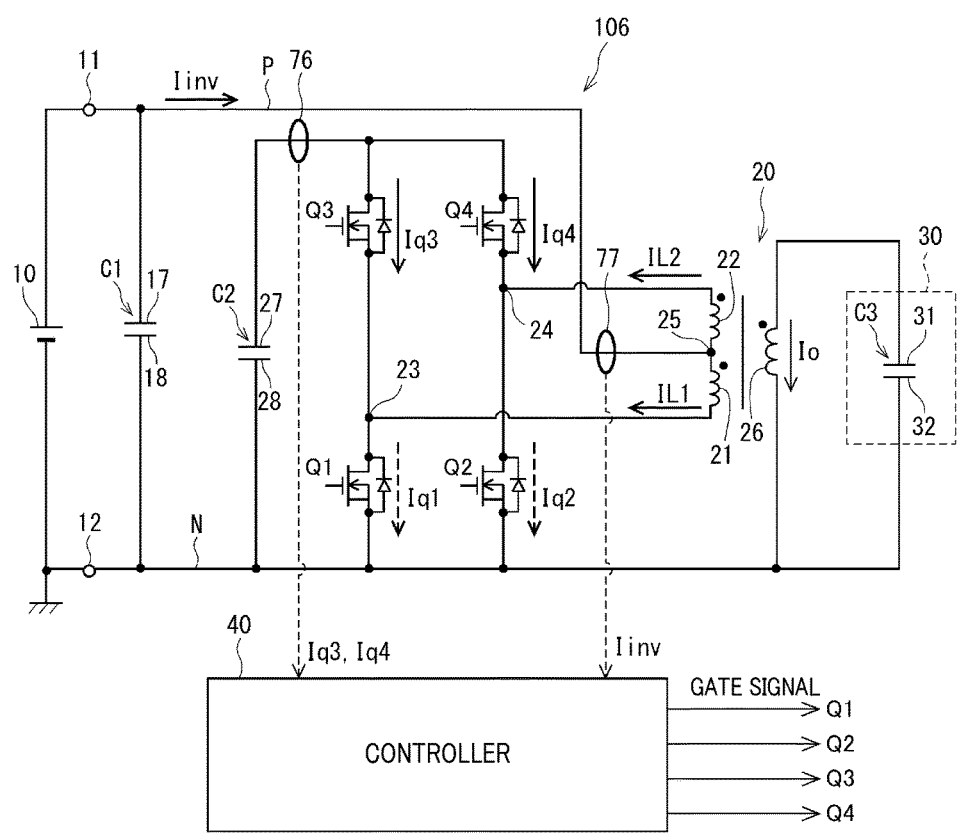
FIG. 18 is a diagram of an arrangement position of a switch-current sensor in an inverter according to a sixth embodiment.

As shown in FIG. 18, in an inverter 106 according to the sixth embodiment, a switch-current sensor 76 is provided between the connection point of the drain terminals of the third switch Q3 and the fourth switch Q4, and the high-potential-side electrode 27 of the clamp capacitor C2. The switch-current sensor 76 alternately detects the third switch current Iq3 and the fourth switch current Iq4 at every half period of the switching period Ts. As a result, a current sensor can be eliminated compared to a configuration according a seventh embodiment. In addition, effects of offset error between two current sensors can be avoided. Furthermore, detection of a current flowing to the clamp capacitor C2 can also be performed.

Figure 19:
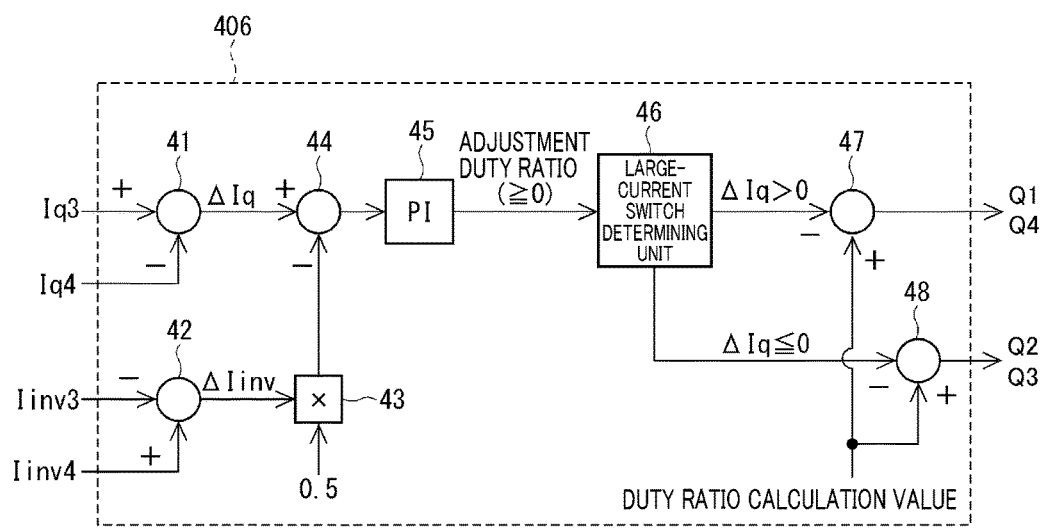
FIG. 19 is a control block diagram of duty ratio adjustment by a controller in an inverter according to the sixth embodiment.

FIG. 19 shows a configuration of a controller 406 that adjusts only the duty ratio of the switch that has the larger switch current, of the first switch Q1 and the second switch Q2, in correspondence to the third embodiment. Unlike that in FIG. 14 according to the third embodiment, in FIG. 19 according to the sixth embodiment, the input to the controller 406 is the third switch current Iq3, the fourth switch current Iq4, and input currents Iinv3 and Iinv4 that are detected at the same timings as the switch currents Iq3 and Iq4. The signs of addition and subtraction by the input-current difference calculator 42 are inverse of those in FIG. 14 and thus (Iinv4−Iinv3) is calculated.

The large-current switch determining unit 46 determines whether or not the switch-current difference $\Delta Iq$ is greater than zero. When $\Delta Iq>0$ (that is, Iq3>Iq4), a value obtained by the adjustment duty ratio being subtracted from the duty ratio calculation value is outputted to the pair of switches composed of the first switch Q1 and the fourth switch Q4. When $\Delta Iq \leq 0$ (that is, Iq3≤Iq4), a value obtained by the adjustment duty ratio being subtracted from the duty ratio calculation value is outputted to the pair of switches composed of the second switch Q2 and the third switch Q3.

Seventh Embodiment

Figure 20:
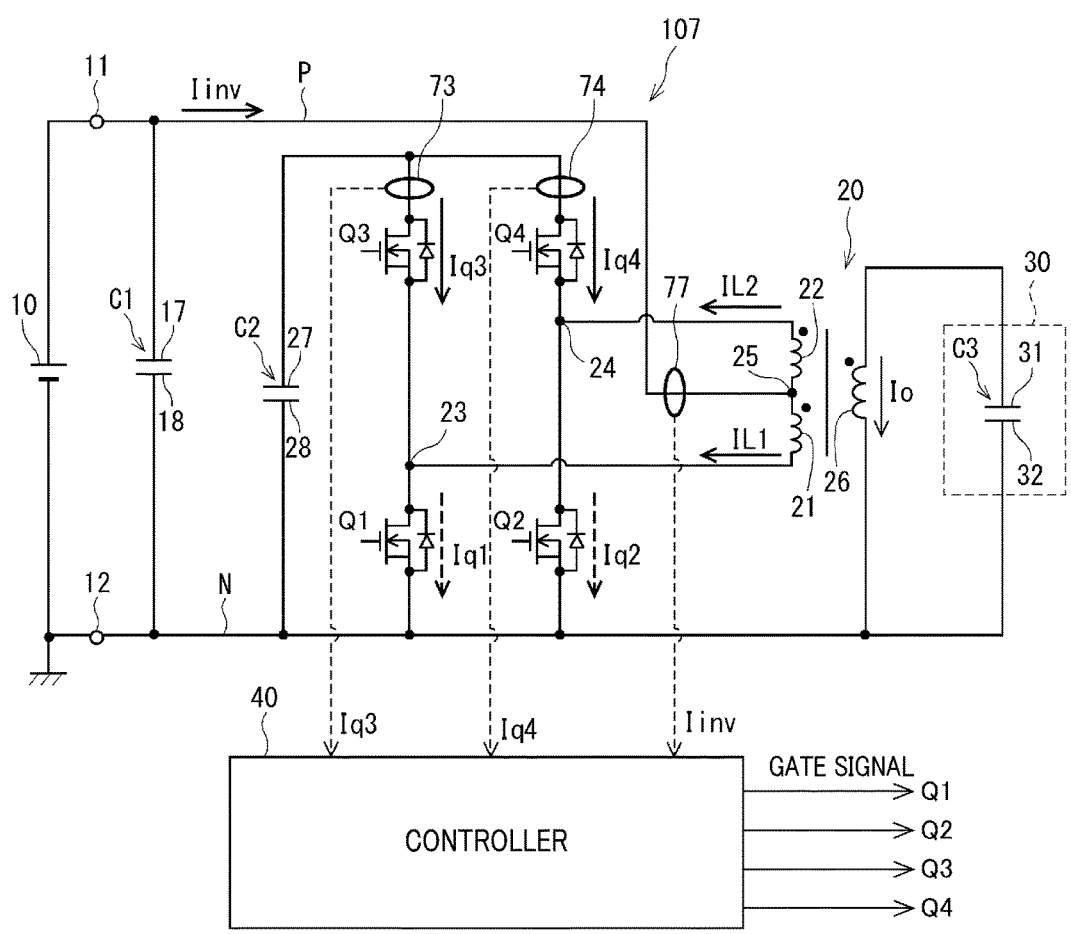
FIG. 20 is a diagram of arrangement positions of switch-current sensors in an inverter according to a seventh embodiment.

As shown in FIG. 20, in an inverter 107 according to a seventh embodiment, switch-current sensors 73 and 74 are respectively provided on the drain side of the third switch Q3 and the drain side of the fourth switch Q4. The switch-current sensor 73 detects the third switch current Iq3. The switch-current sensor 74 detects the fourth switch current Iq4. The switch-current sensors may be provided on the source side of the switches Q3 and Q4, rather than the drain side.

In a manner similar to the fourth embodiment, according to the seventh embodiment, detection of malfunctions in the third switch Q3 and the fourth switch Q4 may also be performed based on the switch currents Iq3 and Iq4 that are individually detected.

Other Embodiments

In the description above, it is suggested that the value of the target ratio $\alpha$ that is applicable for actual control can be interpreted as being expanded to a range of $0<\alpha<1$, in relation to the ideal value of 0.5. More preferably, a correlation between the target ratio $\alpha$ and the biased magnetization current $\Delta IL$ may be determined through experiments and simulations based on specifications of an actual inverter. As a result, for example, the target ratio $\alpha$ may be set as appropriate to ranges such as $0.3 \leq \alpha \leq 0.7$ or $0.4 \leq \alpha \leq 0.6$.

The present disclosure is not limited in any way by the above-described embodiments. Various embodiments are possible without departing from the spirit of the present disclosure.

What is claimed is:

1. A power conversion apparatus comprising:
    a smoothing capacitor that is connected between a high-potential side input terminal and a low-potential side input terminal to which an input voltage of a direct-current power supply is applied;
    a first primary coil and a second primary coil that configure a primary side of a transformer, one end portion of the first primary coil and one end portion of the second primary coil being connected to a center tap that is common to the first primary coil and the second primary coil, the center tap being connected to the high-potential side input terminal;
    a secondary coil that configures a secondary side of the transformer and is connected to a load;
    a first switch and a second switch that alternately operate at a predetermined switching period and configure a lower arm of a bridge circuit,
        a high-potential-side terminal of the first switch being connected to a switch-side end portion that is the other end portion of the first primary coil on a side opposite the center tap, a low-potential-side terminal of the first switch being connected to the low-potential side input terminal, a high-potential-side terminal of the second switch being connected to a switch-side end portion that is the other end portion of the second primary coil on a side opposite the center tap, a low-potential-side terminal of the second switch being connected to the low-potential side input terminal;

a third switch and a fourth switch that alternately operate at the switching period and configure an upper arm of the bridge circuit,
one terminal of the third switch being connected to the switch-side end portion of the first primary coil, and
one terminal of the fourth switch being connected to the switch-side end portion of the second primary coil;

a clamp capacitor that is connected between the other terminal of the third switch and the low-potential side input terminal and between the other terminal of the fourth switch and the low-potential side input terminal;

a controller that calculates a duty ratio that is a ratio of an on-duration of each of bridge-circuit switches to the switching period, and outputs a gate signal to each of the bridge-circuit switches, the bridge-circuit switches being configured by the first switch, the second switch, the third switch, and the fourth switch;

a switch-current sensor that, for switch currents that flow through the bridge-circuit switches, detects a first switch current that flows through the first switch and a second switch current that flows through the second switch, or detects a third switch current that flows through the third switch and a fourth switch current that flows through the fourth switch; and an input-current sensor that detects an input current that flows from the high-potential side input terminal to the center tap via a high-potential side line, wherein the controller adjusts the duty ratio of each of the bridge-circuit switches such that a switch-current difference becomes closer to a value obtained by multiplying an input-current difference by a predetermined target ratio that is a value greater than 0 and less than 1, the switch-current difference being a difference between the first switch current and the second switch current or a difference between the third switch current and the fourth switch current detected by the switch-current sensor at predetermined timings in the switching period, and the input-current difference being a difference between input currents detected by the input-current sensor simultaneously with detection timings of the switch currents.

2. The power conversion apparatus according to claim 1, wherein:
the target ratio is 0.5.

3. The power conversion apparatus according to claim 1, wherein:
the controller increases or decreases the duty ratio of each of the first switch and the second switch such that the switch-current difference becomes closer to a value obtained by multiplying the input-current difference by the target ratio.

4. The power conversion apparatus according to claim 2, wherein:
the controller increases or decreases the duty ratio of each of the first switch and the second switch such that the switch-current difference becomes closer to a value obtained by multiplying the input-current difference by the target ratio.

5. The power conversion apparatus according to claim 1, wherein:
the controller increases or decreases the duty ratio of either of the first switch or the second switch such that the switch-current difference becomes closer to a value obtained by multiplying the input-current difference by the target ratio.

6. The power conversion apparatus according to claim 2, wherein:
the controller increases or decreases the duty ratio of either of the first switch or the second switch such that the switch-current difference becomes closer to a value obtained by multiplying the input-current difference by the target ratio.

7. The power conversion apparatus according to claim 5, wherein:
the controller decreases the duty ratio of the first switch or the second switch that has a larger switch current, of the first switch and the second switch, such that the switch-current difference becomes closer to a value obtained by multiplying the input-current difference by the target ratio.

8. The power conversion apparatus according to claim 6, wherein:
the controller decreases the duty ratio of the first switch or the second switch that has a larger switch current, of the first switch and the second switch, such that the switch-current difference becomes closer to a value obtained by multiplying the input-current difference by the target ratio.

9. The power conversion apparatus according to claim 1, wherein:
the switch-current sensor detects the switch currents at timings that are a predetermined minute amount of time before off-timings of the first switch and the second switch or the third switch and the fourth switch.

10. The power conversion apparatus according to claim 2, wherein:
the switch-current sensor detects the switch currents at timings that are a predetermined minute amount of time before off-timings of the first switch and the second switch or the third switch and the fourth switch.

11. The power conversion apparatus according to claim 1, wherein:
the switch-current sensor detects the switch current at timings at which the switch currents reach a peak.

12. The power conversion apparatus according to claim 2, wherein:
the switch-current sensor detects the switch currents at timings at which the switch currents reach a peak.

13. The power conversion apparatus according to claim 1, wherein:
the first switch includes a source terminal;
the second switch includes a source terminal;
the source terminal of the first switch and the source terminal of the second switch are connected to each other at a connection point; and
the switch-current sensor is provided between the connection point and a low-potential-side electrode of the clamp capacitor.

14. The power conversion apparatus according to claim 2, wherein:
the first switch includes a source terminal;
the second switch includes a source terminal;
the source terminal of the first switch and the source terminal of the second switch are connected to each other at a connection point; and the switch-current sensor is provided between the connection point and a low-potential-side electrode of the clamp capacitor.

15. The power conversion apparatus according to claim 1, wherein:
the input-current sensor is provided on the high-potential side line between the center tap and the smoothing capacitor.

16. The power conversion apparatus according to claim 2, wherein:
the input-current sensor is provided on the high-potential side line between the center tap and the smoothing capacitor.

* * * * *